United States Patent
Covaci et al.

(10) Patent No.: US 12,309,257 B2
(45) Date of Patent: May 20, 2025

(54) SYSTEM AND METHOD FOR AUTHENTICATING OFF-CHAIN DATA BASED ON PROOF VERIFICATION

(71) Applicant: nChain Licensing AG, Zug (CH)

(72) Inventors: Alexandra Covaci, London (GB); Simone Madeo, London (GB); Patrick Motylinski, London (GB); Stephane Vincent, Luxembourg (LU); Craig Steven Wright, London (GB)

(73) Assignee: NCHAIN LICENSING AG, Zug (CH)

( * ) Notice: Subject to any disclaimer, the term of this patent is extended or adjusted under 35 U.S.C. 154(b) by 175 days.

(21) Appl. No.: 16/954,167

(22) PCT Filed: Dec. 12, 2018

(86) PCT No.: PCT/IB2018/059920
§ 371 (c)(1),
(2) Date: Jun. 15, 2020

(87) PCT Pub. No.: WO2019/116248
PCT Pub. Date: Jun. 20, 2019

(65) Prior Publication Data
US 2020/0322132 A1    Oct. 8, 2020

(30) Foreign Application Priority Data
Dec. 15, 2017    (GB) ..................... 1720946

(51) Int. Cl.
*H04L 9/06*    (2006.01)
*G06F 16/22*    (2019.01)
(Continued)

(52) U.S. Cl.
CPC ........ *H04L 9/0637* (2013.01); *G06F 16/2246* (2019.01); *H04L 9/3218* (2013.01); *H04L 9/3247* (2013.01); *H04L 9/50* (2022.05)

(58) Field of Classification Search
None
See application file for complete search history.

(56) References Cited

U.S. PATENT DOCUMENTS

| 4,667,290 A | 5/1987 | Goss et al. |
| 5,297,150 A | 3/1994 | Clark |

(Continued)

FOREIGN PATENT DOCUMENTS

| CN | 104580240 A | 4/2015 |
| CN | 106506146 A | 3/2017 |

(Continued)

OTHER PUBLICATIONS

Beal, Vangie "What is a computer system" [online] Webopedia, Aug. 1, 2022 [retrieved Apr. 8, 2023]. Retrieved from the Internet: URL: https://www.webopedia.com/definitions/computer-system/ (Year: 2022).*

(Continued)

*Primary Examiner* — Taghi T Arani
*Assistant Examiner* — Joshua Raymond White
(74) *Attorney, Agent, or Firm* — Tarolli, Sundheim, Covell & Tummino LLP

(57) ABSTRACT

Determining when and/or how to execute a program or script published to a blockchain network may rely on data that is external to the blockchain (i.e., external data) such as data about the real-world state and events. A prover (e.g., a node of the blockchain network) may perform one or more computations on behalf of a client, such as the execution of the program. To execute the program properly, the prover may rely on external data, which the prover may obtain from a data provider that has a trust relationship with the client (e.g., the client accepts as valid data provided by a trusted data provider). Systems and methods described herein may be utilized by a prover to provide cryptographically verifi- (Continued)

able assurances of the authenticity of input data purportedly obtained from a data provider, the input data utilized in the execution of a program or script published to a blockchain network. An example of a blockchain network is a Bitcoin-based network.

15 Claims, 12 Drawing Sheets

(51) Int. Cl.
  *H04L 9/00* (2022.01)
  *H04L 9/32* (2006.01)

(56) References Cited

U.S. PATENT DOCUMENTS

| | | |
|---|---|---|
| 5,404,531 A | 4/1995 | Wakatani |
| 5,499,191 A | 3/1996 | Young |
| 5,920,830 A | 7/1999 | Hatfield et al. |
| 6,064,928 A * | 5/2000 | Wilson ............... G01P 21/00 701/45 |
| 6,161,180 A * | 12/2000 | Matyas ............ H04L 9/3263 713/192 |
| 6,519,754 B1 | 2/2003 | McElvain et al. |
| 7,085,701 B2 | 8/2006 | Rich et al. |
| 7,209,555 B2 | 4/2007 | Futa et al. |
| 7,281,017 B2 | 10/2007 | Hostetter et al. |
| 7,590,236 B1 | 9/2009 | Boneh et al. |
| 7,796,751 B2 | 9/2010 | Gentry |
| 8,165,287 B2 | 4/2012 | Ghouti et al. |
| 8,189,771 B2 | 5/2012 | Ghouti et al. |
| 8,331,556 B2 | 12/2012 | Billet et al. |
| 8,607,129 B2 | 12/2013 | Radhakrishnan et al. |
| 8,824,670 B2 | 9/2014 | Icart et al. |
| 8,904,181 B1 | 12/2014 | Felsher et al. |
| 9,026,978 B1 | 5/2015 | Liu et al. |
| 9,286,602 B2 | 3/2016 | Rosati et al. |
| 9,483,596 B1 | 11/2016 | Badar et al. |
| 9,569,771 B2 | 2/2017 | Lesavich et al. |
| 10,135,607 B1 | 11/2018 | Roets |
| 10,339,523 B2 | 7/2019 | McDonough et al. |
| 10,419,209 B1 | 9/2019 | Griffin et al. |
| 10,515,567 B2 | 12/2019 | Lablans |
| 11,226,799 B1 | 1/2022 | Sundaresan et al. |
| 11,635,950 B2 | 4/2023 | Covaci et al. |
| 2003/0125917 A1 | 7/2003 | Rich et al. |
| 2004/0015739 A1 | 1/2004 | Heinkel et al. |
| 2005/0004899 A1 | 1/2005 | Baldwin et al. |
| 2005/0139657 A1 | 6/2005 | Hopkins |
| 2005/0262353 A1 | 11/2005 | Gentry et al. |
| 2006/0149962 A1 | 7/2006 | Fountain et al. |
| 2007/0061487 A1 | 3/2007 | Moore et al. |
| 2007/0157132 A1 | 7/2007 | Cheng et al. |
| 2008/0127067 A1 | 5/2008 | Aubertine et al. |
| 2010/0067686 A1 | 3/2010 | Minematsu |
| 2010/0131933 A1 | 5/2010 | Kim et al. |
| 2010/0272209 A1 | 10/2010 | Lee et al. |
| 2011/0024678 A1 | 2/2011 | Schmitt |
| 2011/0200188 A1 | 8/2011 | Ghouti et al. |
| 2012/0284175 A1* | 11/2012 | Wilson ............... G06Q 20/10 705/39 |
| 2013/0031446 A1 | 1/2013 | Kamiya |
| 2013/0097420 A1 | 4/2013 | Zaverucha |
| 2013/0232344 A1 | 9/2013 | Johnson et al. |
| 2014/0250296 A1* | 9/2014 | Hansen ............... H04L 63/1441 713/151 |
| 2014/0321644 A1 | 10/2014 | Lemieux |
| 2014/0337234 A1* | 11/2014 | Tang ............... G06Q 20/3278 705/71 |
| 2015/0363598 A1 | 12/2015 | Xu et al. |
| 2015/0379510 A1 | 12/2015 | Smith |
| 2016/0004820 A1 | 1/2016 | Moore |
| 2016/0087802 A1 | 3/2016 | Peeters |
| 2016/0140340 A1 | 5/2016 | Walters et al. |
| 2016/0162897 A1 | 6/2016 | Feeney |
| 2016/0204938 A1 | 7/2016 | Kounavis et al. |
| 2016/0283941 A1 | 9/2016 | Andrade |
| 2016/0357948 A1 | 12/2016 | Takeuchi |
| 2017/0039330 A1 | 2/2017 | Tanner, Jr. et al. |
| 2017/0048209 A1 | 2/2017 | Lohe et al. |
| 2017/0085545 A1 | 3/2017 | Lohe et al. |
| 2017/0091750 A1 | 3/2017 | Maim |
| 2017/0091756 A1 | 3/2017 | Stern et al. |
| 2017/0131983 A1 | 5/2017 | Roytman et al. |
| 2017/0132421 A1 | 5/2017 | Unitt |
| 2017/0132619 A1 | 5/2017 | Miller et al. |
| 2017/0140408 A1 | 5/2017 | Wuehler |
| 2017/0142103 A1 | 5/2017 | Bringer et al. |
| 2017/0155515 A1 | 6/2017 | Androulaki et al. |
| 2017/0177312 A1 | 6/2017 | Boehm et al. |
| 2017/0178263 A1 | 6/2017 | Kraemer et al. |
| 2017/0180341 A1 | 6/2017 | Walker et al. |
| 2017/0220815 A1 | 8/2017 | Ansari et al. |
| 2017/0221052 A1 | 8/2017 | Sheng et al. |
| 2017/0249716 A1 | 8/2017 | Meixner et al. |
| 2017/0250815 A1 | 8/2017 | Cuende et al. |
| 2017/0277909 A1 | 9/2017 | Kraemer et al. |
| 2017/0278100 A1 | 9/2017 | Kraemer et al. |
| 2017/0279611 A1 | 9/2017 | Kraemer et al. |
| 2017/0286079 A1 | 10/2017 | Cho et al. |
| 2017/0286717 A1 | 10/2017 | Khi et al. |
| 2017/0287090 A1 | 10/2017 | Hunn et al. |
| 2017/0317833 A1 | 11/2017 | Smith et al. |
| 2017/0317834 A1 | 11/2017 | Smith et al. |
| 2017/0337319 A1 | 11/2017 | Camus et al. |
| 2017/0338947 A1 | 11/2017 | Ateniese et al. |
| 2017/0344988 A1 | 11/2017 | Cusden et al. |
| 2017/0352209 A1 | 12/2017 | Keuffer et al. |
| 2017/0353309 A1 | 12/2017 | Gray |
| 2018/0034634 A1 | 2/2018 | Benarroch Guenun et al. |
| 2018/0039667 A1 | 2/2018 | Pierce et al. |
| 2018/0049043 A1 | 2/2018 | Hoffberg |
| 2018/0075453 A1* | 3/2018 | Durvasula .......... G06Q 20/3678 |
| 2018/0089758 A1 | 3/2018 | Stradling et al. |
| 2018/0097630 A1 | 4/2018 | Suresh et al. |
| 2018/0117446 A1 | 5/2018 | Tran et al. |
| 2018/0167201 A1 | 6/2018 | Naqvi |
| 2018/0204005 A1* | 7/2018 | Gajek ............... H04L 9/3218 |
| 2018/0270065 A1 | 9/2018 | Brown et al. |
| 2018/0349631 A1 | 12/2018 | Illendula et al. |
| 2019/0095631 A1 | 3/2019 | Roets et al. |
| 2019/0138753 A1 | 5/2019 | Wallrabenstein |
| 2019/0163887 A1 | 5/2019 | Frederick et al. |
| 2019/0180276 A1 | 6/2019 | Lee et al. |
| 2019/0182035 A1 | 6/2019 | Chari et al. |
| 2019/0295182 A1 | 9/2019 | Kfir et al. |
| 2020/0050780 A1* | 2/2020 | Uhr ............... G06F 21/64 |
| 2020/0184557 A1 | 6/2020 | Wang |
| 2020/0327498 A1 | 10/2020 | Weber et al. |
| 2021/0019746 A1 | 1/2021 | Adjaz et al. |
| 2021/0073795 A1* | 3/2021 | Ruiz ............... H04L 9/3215 |
| 2021/0342490 A1 | 11/2021 | Briancon et al. |
| 2023/0269070 A1 | 8/2023 | Covaci et al. |
| 2024/0143739 A1 | 5/2024 | Cao et al. |

FOREIGN PATENT DOCUMENTS

| | | |
|---|---|---|
| CN | 106534317 A | 3/2017 |
| CN | 107040545 A | 8/2017 |
| CN | 107179932 A | 9/2017 |
| CN | 107274184 A | 10/2017 |
| CN | 107426234 A | 12/2017 |
| EP | 3249599 A1 | 11/2017 |
| JP | H08305547 A | 11/1996 |
| JP | 2006505055 A | 2/2006 |
| JP | 2009541853 A | 11/2009 |
| JP | 2011119952 A | 6/2011 |
| JP | 5697153 B2 | 4/2015 |
| JP | 2015132754 A | 7/2015 |
| JP | 2021502636 A | 1/2021 |
| JP | 7208989 B2 | 1/2023 |
| JP | 7221954 B2 | 2/2023 |
| JP | 7285840 B2 | 6/2023 |

(56) References Cited

FOREIGN PATENT DOCUMENTS

| KR | 101795696 | B1 | 11/2017 |
|---|---|---|---|
| KR | 20200096790 | A | 8/2020 |
| WO | 2016131577 | A1 | 8/2016 |
| WO | 2016155804 | A1 | 10/2016 |
| WO | 2016206567 | A1 | 12/2016 |
| WO | 2017008829 | A1 | 1/2017 |
| WO | 2017032541 | A1 | 3/2017 |
| WO | 2017079652 | A1 | 5/2017 |
| WO | 2017104149 | A1 | 6/2017 |
| WO | 2017145010 | A1 | 8/2017 |
| WO | 2017148527 | A1 | 9/2017 |
| WO | 2017178956 | A1 | 10/2017 |
| WO | 2017187396 | A1 | 11/2017 |
| WO | 2017187398 | A1 | 11/2017 |
| WO | 2017187399 | A1 | 11/2017 |
| WO | 2017190795 | A1 | 11/2017 |
| WO | 2018127446 | A1 | 7/2018 |
| WO | 2018127456 | A2 | 7/2018 |
| WO | 2019092545 | A1 | 5/2019 |

OTHER PUBLICATIONS

Itzdorf, Hubert et al. "TLS-N: Non-repudiation over TLS Enabling Ubiquitous Content Signing for Disintermediation" [online] IACR, Jun. 13, 2017 [retrieved Apr. 23, 2022]. Retrieved from the Internet: URL: https://eprint.iacr.org/2017/578.pdf (Year: 2017).*

Ritzdorf, Hubert et al. "TLS-N: Non-repudiation over TLS Enabling Ubiquitous Content Signing for Disintermediation" [online] IACR, Jun. 13, 2017 [retrieved Apr. 23, 2022]. Retrieved from the Internet: URL: https://eprint.iacr.org/2017/578.pdf (Year: 2017).*

KLmoney "Part 1: Transaction Basics" [online] KLmoney, Jun. 6, 2017 [retrieved Apr. 23, 2022]. Retrieved from the Internet: URL: https://web.archive.org/web/20170606202729/https://klmoney.wordpress.com/bitcoin-dissecting-transactions-part-1/ (Year: 2017).*

"How Log Proofs Work," Certificate Transparency, Sep. 25, 2017 [retrieved May 2, 2018], https://web.archive.org/web/20170925180136/http://www.certificate-transparency.org/log-proofs-work, 5 pages.

Anonymous, "Background Page," Oraclize, Oct. 2017 [retrieved May 2, 2018], https://web.archive.org/web/20171017121053/http://docs.oraclize.it/, 18 pages.

Antonopoulos, "Mastering Bitcoin—Unlocking Digital Cryptocurrencies," O'Reilly Media, Inc., Dec. 20, 2014, 282 pages.

Bertani et al., "How can I trust smart contracts that use Oraclize?," Reddit, May 25, 2017 [retrieved May 2, 2018], https://www.reddit.com/r/ethereum/comments/6d7j7x/how_can_i_trust_smart_contracts_that_use_oraclize/di0nb17/, 5 pages.

Brown et al., "Transport layer security (tls) evidence extensions," Working Draft, IETF Secretariat, Internet-Draft drafthousley-evidence-extns-01, https://tools.ietf.org/pdf/draft-housley-evidence-extns-01, Nov. 2006 [retrieved May 2, 2018], 21 pages.

Fu, "Off-Chain Computation Solutions for Ethereum Developers," Medium, Sep. 12, 2017 [retreived May 2, 2018], https://medium.com/@YondonFu/off-chain-computation-solutions-for-ethereum-developers-507b23355b17, 8 pages.

International Search Report and Written Opinion mailed Mar. 14, 2019, Patent Application No. PCT/IB2018/059920, 12 pages.

Kumaresan et al., "How to Use Bitcoin to Incentivize Correct Computations," retrieved from https://people.csail.mit.edu/ranjit/papers/incentives.pdf, Nov. 2014, 12 pages.

Nakamoto, "Bitcoin: A Peer-to-Peer Electronic Cash System," Bitcoin, Oct. 31, 2008, https://bitcoin.org/bitcoin.pdf, 9 pages.

Ritzdorf et al., "TLS-N: Non-repudiation over TLS Enabling Ubiquitous Content Signing for Disintermediation," IACR ePrint report, first disclosed 2017 [retrieved May 2, 2018], 16 pages.

Satoshi et al., "Connection Limits," Bitcoin Forum, Aug. 9, 2010, https://bitcointalk.org/index.php?topic=741.0;prev_next=prev, 2 pages.

Spencertruman et al., "[Whitepaper] Witnet: A Decentralized Oracle Network Protocol," Bitcoin Forum, Dec. 11, 2017 [retrieved May 2, 2018], https://bitcointalk.org/index.php?topic=2567253.0, 9 pages.

Tarr, "Merkle Tree Logs #27," https://github.com/ssbc/secure-scuttlebutt/issues/27, Sep. 17, 2014, 4 pages.

Tarr, "Tree-Exchange," Github, Aug. 4, 2014 (last updated Sep. 17, 2014) [retrieved May 10, 2018], https://github.com/dominictarr/tree-exchange, 3 pages.

UK Commercial Search Report mailed May 4, 2018, Patent Application No. GB1720946.1, 8 pages.

UK IPO Search Report mailed Jun. 15, 2018, Patent Application No. GB1720946.1, 4 pages.

Van Den Hooff et al., "VerSum: Verifiable Computations over Large Public Logs," Proceedings of the 2014 ACM SIGSAC Conference on Computer and Communications Security, Nov. 3, 2014, 14 pages.

Zhang et al., "A Remote-Attestation-Based Extended Hash Algorithm for Privacy Protection," 2017 International Conference on Computer Network, Electronic and Automation (ICCNEA), Sep. 23, 2017, 4 pages.

Ben-Sasson et al. "Scalable Zero Knowledge via Cycles of Elliptic Curves" [online] IACR, Sep. 18, 2016 [retrieved Feb. 10, 2022]. Retrieved from https://eprint.iacr.org/2014/595.pdf, 2016, 49 pages.

Ben-Sasson et al., "SNARKs for C: Verifying program executions succinctly and in zero knowledge," Advances in Cryptology—Crypto 2013, Aug. 18, 2013, 19 pages.

Ben-Sasson et al., "Succinct Non-Interactive Zero Knowledge for a von Neumann Architecture," USENIX Security 2014, first disclosed Dec. 30, 2013, last revised May 19, 2015, https://eprint.iacr.org/2013/879.pdf, 37 pages.

Ben-Sasson et al., "Zerocash: Decentralized Anonymous Payments from Bitcoin," 2014 IEEE Symposium on Security and Privacy, May 18, 2014, http://zerocash-project.org/media/pdf/zerocash-oakland2014.pdf, 16 pages.

Bertani, "Scalable Onchain Verification for Authenticated Data Feeds and Offchain Computations," YouTube, Ethereum Foundation, Nov. 26, 2017 [retrieved May 10, 2018], https://www.youtube.com/watch?v=7uQdEBVu8Sk, 19:19, 4 pages.

Bitcoin Core, "The First Successful Zero-Knowledge Contingent Payment", 2022, 5 pages.

Bitcoinstrings, "Blockchain in Words," retrieved from https://bitcoinstrings.com/blk00281.txt, Dec. 2013, 667 pages.

Bowe, "Pay-to-Sudoku," GitHub, retrieved from https://github.com/zcash-hackworks/pay-to-sudoku/blob/master/README.md, 2016, 2 pages.

Buterin, "Quadratic Arithmetic Programs: from Zero to Hero," retrieved from https://medium.com/@VitalikButerin/quadratic-arithmetic-programs-from-zero-to-hero-f6d558cea649, Dec. 11, 2016, 9 pages.

Campanelli et al., "Zero-knowledge contingent payments revisited: Attacks and payments for services," Proceedings of the 2017 Acm Sigsac Conference on Computer and Communications Security, Oct. 30, 2017, 28 pages.

Canetti et al., "Practical Delegation of Computation Using Multiple Servers," CCS, Oct. 17, 2011, 10 pages.

Castor, "Trust Your Oracle? Cornell Launches Tool for Confidential Blockchain Queries," CoinDesk, retrieved from https://www.coindesk.com/tech/2017/05/17/trust-your-oracle-cornell-launches-tool-for-confidential-blockchain-queries/, May 17, 2017, 5 pages.

Chen et al., "Algebraic Geometric Secret Sharing Schemes and Secure Multi-Party Computations over Small Fields", Advances in Cryptology, 2006, 16 pages.

Commercial Search Report mailed Feb. 28, 2018, United Kingdom Patent Application No. 1719998.5, filed Nov. 30, 2017, 6 pages.

Costello et al., "Geppetto: versatile Verifiable Computation," 2015 IEEE Symposium on Security and Privacy, 2015, 22 pages.

Covaci et al., "Computer-implemented system and method," United Kingdom Patent Application No. 1720946.1, filed Dec. 15, 2017.

Covaci et al., "Extracting Information from the CRS in a ZK Protocol on Blockchain," United Kingdom Patent Application No. 1719998.5, filed Nov. 30, 2017, 39 pages.

Covaci et al., "Logic Minimisation of C-like Smart Contracts for Optimised Verifiable Computation," United Kingdom Patent Application No. 1718505.9, filed Nov. 9, 2017, 38 pages.

Covaci et al., "NECTAR: Non-Interactive Smart Contract Protocol using Blockchain Technology," arXiv preprint arXiv:1803.04860, Mar. 13, 2018, 8 pages.

(56) References Cited

OTHER PUBLICATIONS

Davidsen et al., "Empowering the Economy of Things," 2017, 54 pages.
Eberhardt et al., "ZoKrates—Scalable Privacy-Preserving Off-Chain Computations," Information Systems Engineering (ISE), Aug. 2018, 8 pages.
Ethereum Foundation, "ZoKrates—A Toolbox for zkSNARKS on Ethereum," https://www.youtube.com/watch?v=sSlrywb5J_0, Nov. 26, 2017, 12 pages.
Fee et al., "Cryptography using Chebyshev polynomials," Maple Summer Workshop, Burnaby, Canada, Jul. 11, 2004, http://www.cecm.sfu.ca/CAG/ppaers/CHEB, 16 pages.
Fiore et al., Hash First, Argue Later Adaptive Verifiable Computations on Outsourced Data, ACM Computer and Communications Security, 2016, 40 pages.
Fournet et al., "A Certified Compiler for Verifiable Computing," HAL Open Science, Jun. 2016, 14 pages.
Franz et al., "CBMC-GC: An ANSI C Compiler for Secure Two-Party Computations," retrieved from https://arise.or.at/pubpdf/CBMC-GC__An_ANSI_C_Compiler_for_Secure_Two-Party_Computations.pdf, 2014, 5 pages.
Fuchsbauer et al., "Proofs on Encrypted Values in Bilinear Groups and an Applicaiton to Anonymity of Signatures," Third International Conference on Pairing-based Cryptography, Aug. 2009, 26 pages.
Gennaro et al., "Quadratic Span Programs and Succint NIZKs without PCPs," Annual International Conference on the Theory and Applications of Cryptographic Techniques, May 26, 2013, 20 pages.
Gennaro et al., "Robust Threshold DSS Signatures," International Conference on the Theory and Applications of Cryptographic Techniques, May 12, 1996, https://link.springer.com/content/pdf/10.1007%2F3-540-68339-9_31.pdf, 18 pages.
Goldfeder et al., "Escrow Protocols for Cryptocurrencies: How to Buy Physical Goods Using Bitcoin," retrieved from http://stevengoldfeder.com/papers/escrow.pdf, Jul. 26, 2018, 27 pages.
Hajjeh et al., "TLS Sign," TLS Working Group, Internet Draft Version 4, Dec. 15, 2007 [retrieved May 2, 2018], https://tools.ietf.org/html/draft-hajjeh-tls-sign-04, 12 pages.
Hearn, "Continuing the zkSNARK Tutorials," retrieved from https://blog.plan99.net/vntinyram-7b9d5b299097, Dec. 15, 2016, 9 pages.
Hong et al., "Verifiable Computation of Large Polynomials," retrieved from http://or.nsfc.gov.cn/bitstream/00001903-5/154735/1/1000009080185.pdf, Dec. 16, 2014, 13 pages.
International Search Report and Written Opinion mailed Jan. 15, 2019, Patent Application No. PCT/IB2018/058434, 11 pages.
International Search Report and Written Opinion mailed Jan. 17, 2019, Patent Application No. PCT/IB2018/058432, 11 pages.
International Search Report and Written Opinion mailed Jan. 17, 2019, Patent Application No. PCT/IB2018/058437, 10 pages.
International Search Report and Written Opinion mailed Jan. 22, 2019, Patent Application No. PCT/IB2018/058583, 10 pages.
International Search Report and Written Opinion mailed Jan. 23, 2019, Patent Application No. PCT/IB2018/058433, 12 pages.
International Search Report and Written Opinion mailed Jan. 23, 2019, Patent Application No. PCT/IB2018/058491, 12 pages.
International Search Report and Written Opinion mailed Mar. 14, 2019, Patent Application No. PCT/IB2018/059770, 12 pages.
International Search Report and Written Opinion mailed Mar. 19, 2019, Patent Application No. PCT/IB2018/059918, 14 pages.
Jehan, "Rockchain Decentralized Audited Data Networks," White Paper, retrieved from https://www.rockchain.org/RockchainWhitePaper.pdf, Jan. 20, 2018, 28 pages.
Kerber, "Verifiable Computation in Smart Contracts," University of Edinburgh School of Informatics Computer Science 4th Year Project Report, published online Apr. 4, 2017 [retrieved May 2, 2018], https://git.drwx.org/bsc/proj-report/raw/branch/master/report.pdf, 49 pages.
Keutzer et al., "Anatomy of a Hardware Compiler," 1988, 10 pages.
Kiayias et al., "Proofs of Proofs of Work with Sublinear Complexity," Financial Cryptography and Data Security, 2016, 18 pages.
Kosba et al., "Hawk: The Blockchain Model of Cryptography and Privacy-Preserving Smart Contracts," IEEE Symposium on Security and Privacy, May 22, 2016, 31 pages.
Kreuter, "Techniques for Scalable Secure Computation Systems," retrieved from https://repository.library.northeastern.edu/files/neu:cj82rh04k/fulltext.pdf, May 2018, 145 pages.
Król et al., "SPOC: Secure Payments for Outsourced Computations," Jul. 17, 2018, 6 pages.
Kuzminov et al., "Bridging the Gaps with Iolite Blockchain," Iolite Foundation White Paper, 2017, 13 pages.
Malkhi et al., "Fairplay—A Secure Two-Party Computation System," Aug. 2004, 17 pages.
Mathworks, "MATLAB Coder—Generate C and C++ Code From MATLAB Code," 9 pages.
Maxwell et al., "Chat logs," Bitcoin-wizards IRC Chat Channel, Aug. 16, 2013 [retrieved May 2, 2018], https://download.wpsoftware.net/bitcoin/wizards/2013/08/13-08-16.log, 1 page.
Maxwell et al., "CoinCovenants using SCIP signatures, an amusingly bad idea," Bitcoin Forum, Aug. 20, 2013 [retrieved Apr. 13, 2018], https://bitcointalk.org/index.php?topic=278122.0, 5 pages.
Maxwell et al., "Really Really ultimate blockchain compression: CoinWitness," Bitcoin Forum, Aug. 19, 2013 [retrieved Apr. 11, 2018], https://bitcointalk.org/index.php?topic=277389.0, 7 pages.
Maxwell, "The First Successful Zero-Knowledge Contingent Payment," Bitcoin Core, retrieved from https://bitcoincore.org/en/2016/02/26/zero-knowledge-contingent-payments-announcement/, Feb. 26, 2016, 5 pages.
Mayer, "zk-SNARK Explained: Basic Principles," Dec. 13, 2016, 9 pages.
Mayer, "zk-SNARK explained: Basic Principles," retrieved from https://www.researchgate.net/publication/321124635_zk-SNARK_explained_Basic_Principles, Dec. 2016, 9 pages.
Müller, "A Short Note on Secret Sharing Using Elliptic Curves," Proceedings of SECRYPT 2008, Jul. 26, 2008, http://www.scitepress.org/Papers/2008/19183/19183.pdf, 4 pages.
Ning, "Automatically Convert MATLAB Code to C Code," https://www.mathworks.com/videos/automatically-converting-matlab-code-to-c-code-96483.html, Augusst 19, 2014, 8 pages.
Paganini, Pierluigi What is a Digital Signature? Fundamental Principles, Security Affairs, May 2012, https://securityaffairs.com/5223/digital-id/what-is-a-digital-signature-fundamental-principles.html, 7 pages.
Parno et al., "Pinocchio: Nearly Practical Verifiable Computation," IEEE Symposium on Security and Privacy, May 19, 2013, 16 pages.
Parno et al., "Pinocchio: Nearly Practical Verifiable Computation," IEEE Symposium on Security and Privacy, May 19-22, 2013, 16 pages.
Parno, "A Note on the Unsoundness of vnTinyRAM's SNARK," retrieved from https://eprint.iacr.org/2015/437, May 6, 2015, 4 pages.
Prasad et al., "Effect pf Quine-McCluskey Simplification on Boolean Space Complexity," IEEE Xplore, Jul. 25-26, 2009, 6 pages.
Schaeffer et al., "ZoKrates—a Toolbox for zkSNARKS on Ethereum," https://github.com/Zokrates/ZoKrates, Feb. 4, 2019, 3 pages.
Schoenmakers et al., "Trinocchio: Privacy-Preserving Outsourcing by Distributed Verifiable Computation," International Conference on Applied Cryptography and Network Security, Jun. 19, 2016, https://eprint.iacr.org/2015/480.pdf, 33 pages.
Stuart, "EECS Presents Awards for Outstanding PhD and SM Theses," EECS, Nov. 8, 2017, 2 pages.
Sward et al. "Data Insertion in Bitcoin's Blockchain" [online] Augustana College, Jul. 2017 [retrieved Feb. 10, 2022]. Retrieved from the Internet: URL: https://digitalcommons.augustana.edu/cgi/viewcontent.cgi?article=1000&context=cscfaculty 2017, 19 pages.
Tarr et al., "Merkle Tree Logs #27," GitHub Secure-Scuttlebutt project page, Sep. 17, 2014 [retrieved May 10, 2018], https://github.com/ssbc/secure-scuttlebutt/issues/27, 4 pages.
Teutsch et al., "A scalable verification solution for blockchains," Nov. 16, 2017, https://people.cs.uchicago.edu/~teutsch/papers/truebit.pdf, 50 pages.
Tillich et al., "Circuits of basic functions suitable for MPC and FHE," https://homes.esat.kuleuven.be/~nsmart/MPC/, first disclosed 2012, retrieved May 2, 2018, 2 pages.

(56) References Cited

OTHER PUBLICATIONS

Todd, "[bitcoin-dev] Building Blocks of the State Machine Approach to Consensus," petertodd.org, Jun. 20, 2016, https://lists.linuxfoundation.org/pipermail/bitcoin-dev/2016-June/012773.html, six pages.
Turner, "Cse 260. Introduction to Digital Logic and Computer Design," Syllabus and Text Book, https://www.arl.wustl.edu/-jst/cse/260/ddc.pdf, 2015, 435 pages.
Turner, "Designing Digital Circuits a modern approach," CSE 260, Introduction to Digital Logic and Computer Design, Spring 2014, 435 pages.
UK Commercial Search Report mailed Dec. 3, 2018, Patent Application No. GB1806444.4, 8 pages.
UK Commercial Search Report mailed Feb. 2, 2018, Patent Application No. GB1718505.9, 7 pages.
UK Commercial Search Report mailed May 31, 2018, Patent Application No. GB1801753.3, 8 pages.
UK Commercial Search Report mailed Oct. 25, 2018, Patent Application No. GB1805948.5, 9 pages.
UK IPO Search Report mailed Jul. 26, 2018, Patent Application No. GB1801753.3, 5 pages.
UK IPO Search Report mailed Nov. 2, 2018, Patent Application No. GB1805948.5, 4 pages.
UK IPO Search Report mailed Nov. 8, 2018, Patent Application No. GB1806444.4, 6 pages.
United Kingdom Commercial Search Report mailed Apr. 20, 2018, Patent Application No. 1720768.9, filed Dec. 13, 2017, 8 pages.
United Kingdom Intellectual Property Office Search Report mailed Jun. 12, 2018, Patent Application No. 1720768.9, filed Dec. 13, 2017, 7 pages.
United Kingdom Intellectual Property Office Search Report mailed May 3, 2018, Patent Application No. 1719998.5, filed Nov. 30, 2017, 6 pages.
United Kingdom IPO Search Report mailed Apr. 27, 2018, Patent Application No. 1718505.9, filed Nov. 9, 2017, 5 pages.
Viacoin Dev Team, "Styx: Unlinkable Anonymous Atomic Payment Hub For Viacoin," viacoin.org, Oct. 14, 2016, http://docplayer.net/35213119-Styx-unlinkable-anonymous-atomic-payment-hub-for-viacoin-viacoin-dev-team-viacoin-org.html, 18 pages.
Virza, "On Deploying Succinct Zero-Knowledge Proofs" [online] MIT, Sep. 2017 [retrieved Feb. 10, 2022]. Retrieved from the Internet: URL: On Deploying Succinct Zero-Knowledge Proofs, 2016, 131 pages.
Wikipedia, "Huffman coding," Wikipedia the Free Encyclopedia, Febraury 24, 2018, https://en.wikipedia.org/w/index.php?title=Huffman_coding&oldid=827366029, 11 pages.
Wikipedia, "Precompiled Header," Retrieved Mar. 30, 2022, https://en.wikipedia.org/w/index.php?title=Precompiled_header&oldid=807155683, 3 pages.
Wikipedia, "Zero Knowledge Contingent Payment," Bitcoin Wiki, retrieved from https://en.bitcoin.it/wiki/Zero_Knowledge_Contingent_Payment, Apr. 8, 2020, 3 pages.
Wu et al., "Libsnark: a C++ Library for zkSNARK Proofs," SCIPR Lab, libsnark/README.md at 92a80f74727091fdc40e6021dc42e9f6b67d5176, Aug. 18, 2017, 9 pages.
Zcash, "zk-SNARKs," zCash website, retreived Apr. 1, 2022 from https://web.archive.org/web/20171107012237/https://z.cash/technology/zksnarks.html, Nov. 24, 2017, 1 page.
Zyskind et al., "Enigma: Decentralized Computation Platform with Guaranteed Privacy," arXiv preprint arXiv:1506, Jun. 10, 2015, 14 pages.
Justus, Benjamin, "Point Compression and Coordinate Recovery for Edwards Curves over Finite Field", Annals of West University of Timisoara-Mathematics and Computer Science, 2014, 15 pages.
Intellectual Property Office of Korea, "Request for the Submission of an Opinion" in Application No. 10-2020-7014213, Jan. 31, 2024, 7 pages.
Japan Patent Office "Notice of Reasons for Rejection" in Application No. 2023-014319, Feb. 13, 2024, 12 pages.
Menezes et al., "Handbook of Applied Cryptography: pp. 33, 38," CRC Press, Oct. 16, 1996, 3 pages.
Al-Riyami, Sattam, S., "Cryptographic Schemes Based on Elliptic Curve Pairings", Technical Report, RHUL-MA-2002-2, Feb. 2, 2005, 278 pages.
Sanchez, David Cerezo, "Raziel: Private and Verifiable Smart Contracts in Blockchains", Sep. 17, 2017, 55 pages.
Seijas et al., "Scripting Smart Contract for Distributed Ledger Technology", Feb. 10, 2017, 33 pages.
Intellectual Property Office of Korea, "Request for the Submission of an Opinion" in Application No. 10-2024-7024191, Aug. 5, 2024, 4 pages.
Shocker, Ali, "Sustainable Blockchain through Proof of exercise", 2017 IEEE 16th International Symposium on Network Computing and Applications (NCA), Nov. 1, 2017, 9 pages.
Ball, M. et al., "Proof of Useful Work", Cryptology ePrint Archive, Report, Feb. 27, 2017, 31 pages.
Japanese Patent Office "Notice of Reasons for Refusal", dated Jul. 30, 2024, Application No. 2023-176820, 7 pages.
CN Office Action for corresponding CN Patent Application No. 201880072692.7, dated Feb. 29, 2024, 18 pages.

\* cited by examiner

SYSTEM AND METHOD FOR AUTHENTICATING OFF-CHAIN DATA BASED ON PROOF VERIFICATION

FIELD OF INVENTION

This invention relates generally to blockchain technologies, and more particularly to the production of a proof of a conversation that can be verified in a Bitcoin script, offering also information that can be utilized further in case of recourse. The proof that certain communications occurred during the conversation may utilize Merkle trees. Data of the conversation or communications may be utilized as an input to correctly execute a program or script. The invention is particularly suited, but not limited to, use in smart contract generation and execution.

BACKGROUND OF INVENTION

In this document the term 'blockchain' may refer to any of several types of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to as a useful application of the technology described herein for the purpose of convenience and illustration, Bitcoin is just one of many applications to which the technology described in the present disclosure may be applied. However, it should be noted that the invention is not limited to use with the Bitcoin blockchain and alternative blockchain implementations and protocols, including non-commercial applications, also fall within the scope of the present invention. For example, techniques described within the present disclosure would provide advantages to utilising other blockchain implementations that have limitations similar to Bitcoin regarding the execution of a program or script published to a blockchain network that may rely on data that is external to the blockchain.

A blockchain may refer to a peer-to-peer, electronic ledger which is implemented as a computer-based decentralised system made up of blocks which in turn may be made up of transactions and other information. In some examples, a "blockchain transaction" refers to an input message encoding a structured collection of field values comprising data and a set of conditions, where fulfilment of the set of conditions is prerequisite for the set of fields to be written to a blockchain data structure. For example, with Bitcoin each transaction is a data structure that encodes the transfer of control of a digital asset between participants in the blockchain system, and includes at least one input and at least one output. In some embodiments, a "digital asset" refers to binary data that is associated with a right to use. Examples of digital assets include Bitcoin, ether, and Litecoins. The term "Bitcoin" is used herein to include any protocol that is a variant of the Bitcoin protocol. In some implementations, transferring control of a digital asset can be performed by reassociating at least a portion of a digital asset from a first entity to a second entity. Each block of the blockchain may contain a hash of the previous block to that blocks become chained together to create a permanent, unalterable record of all transactions which have been written to the blockchain since its inception.

In some examples, "stack-based scripting language" refers to a programming language that supports various stack-based or stack-oriented execution models and operations. That is, the stack-based scripting language may utilize a stack. With the stack, values can be pushed onto the top of the stack or popped from the top of the stack. Various operations performed to manipulate the stack can result in pushing or popping one or more of the values to or from the top of the stack. For example, an OP_EQUAL operation pops the top two items from the stack, compares them, and pushes a result (e.g., 1 if equal or 0 if unequal) to the top of the stack. Other operations performed to the stack, such as OP_PICK, may allow items to be selected from positions other than the top of the stack. In some scripting languages employed by some of the present embodiments, there may be at least two stacks: a main stack and an alternate stack. Some operations of the scripting language can move items from the top of one stack to the top of another stack. For example, OP_TOALTSTACK, moves a value from the top of the main stack to the top of the alternate stack. It should be noted that a stack-based scripting language, in some cases, may not be limited solely to operation in a strictly last-in-first-out (LIFO) manner. For example, a stack-based scripting language may support operations that copies or moves the n-th item in the stack to the top (e.g., OP_PICK and OP_ROLL respectively, in Bitcoin). Scripts written in a stack-based scripting language may be pushed onto a logical stack that can be implemented using any suitable data structure such as a vector, list, or stack.

In order for a transaction to be written to the blockchain, it must be "validated". Network nodes (mining nodes) perform work to ensure that each transaction is valid, with invalid transactions rejected from the network. A node can have standards for validity different from other nodes. Because validity in the blockchain is consensus based, a transaction is considered valid if a majority of nodes agree that a transaction is valid. Software clients installed on the nodes perform this validation work on transactions referencing an unspent transaction (UTXO) in part by executing the UTXO locking and unlocking scripts. If execution of the locking and unlocking scripts evaluates to TRUE and other validation conditions, if applicable, are met, the transaction is validated by the node. The validated transaction is propagated to other network nodes, whereupon a mining node can select to include the transaction in a blockchain. Thus, in order for a transaction to be written to the blockchain, it must be i) validated by the first node that receives the transaction—if the transaction is validated, the node relays it to the other nodes in the network; and ii) added to a new block built by a mining node; and iii) mined, i.e., added to the public ledger of past transactions. The transaction is considered to be confirmed when a sufficient number of blocks is added to the blockchain to make the transaction practically irreversible.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing etc.) while being more versatile in their applications.

The present disclosure describes technical aspects of one or more blockchain-based computer programs. A blockchain-based computer program may be a machine readable and executable program recorded in a blockchain transaction. The blockchain-based computer program may comprise rules that can process inputs in order to produce results, which can then cause actions to be performed dependent upon those results. One area of current research is the use of blockchain-based computer programs for the implementation of "smart contracts". Unlike a traditional contract which would be written in natural language, smart contracts may be computer programs designed to automate the execution of the terms of a machine-readable contract or agreement.

Another area of blockchain-related interest is the use of 'tokens' (or 'coloured coins') to represent and transfer real-world entities via the blockchain. A potentially sensitive or secret item can be represented by the token which has no discernible meaning or value. The token thus serves as an identifier that allows the real-world item to be referenced from the blockchain.

In embodiments, although interaction with specific entities can be encoded at specific steps in the smart contract, the smart contract can otherwise be automatically executed and self-enforced. It is machine readable and executable. In some examples, automatic execution refers to the execution of the smart contract that is successfully performed to enable transfer of the UTXO. Note that in such examples, "an entity" that is able to cause the transfer of the UTXO refers to an entity that is able to create the unlocking script without being required to prove knowledge of some secret. In other words, the unlocking transaction can be validated without verifying that the source of the data (e.g., an entity that created the unlocking transaction) has access to a cryptographic secret (e.g., private asymmetric key, symmetric key, etc.). Also, in such examples, self-enforcement refers to the validation nodes of the blockchain network being caused to enforce the unlocking transaction according to the constraints. In some examples, "unlocking" a UTXO refers to creating an unlocking transaction that references the UTXO and executes as valid.

A blockchain transaction output includes a locking script and information regarding ownership of digital assets such as Bitcoins. The locking script, which may also be referred to as an encumbrance, "locks" the digital assets by specifying conditions that are required to be met in order to transfer the UTXO. For example, a locking script could require that certain data be provided in an unlocking script to unlock the associated digital assets. The locking script is also known as "scriptPubKey" in Bitcoin. A technique for requiring a party to provide data to unlock a digital asset involves embedding a hash of the data inside the locking script.

The invention may be described as systems and methods for execution of smart contracts on a blockchain which may utilize zero-knowledge proofs. The execution of a smart contract can happen as part of the transaction validation. As part of executing a smart contract, it may be desirable to obtain access to data external to the blockchain (e.g., off-chain data) such as data about real-world state and events. Techniques described herein may be utilized in which data provided by a data source is authenticated and utilized in the execution of a program or script such as a smart contract published to a blockchain network. Although the digital asset may, in some embodiments, be used as cryptocurrency, it is contemplated that the digital asset, in embodiments, is additionally or alternatively usable in other contexts. Note that the invention, while applicable to the control of digital assets, is technical in nature and can be used in other contexts that utilise blockchain data structures without necessarily involving the transfer of digital assets.

SUMMARY OF INVENTION

Thus, it is desirable to provide methods and systems that improve blockchain technology in one or more of these aspects. Such an improved solution has now been devised. Thus, in accordance with the present invention there is provided a method as defined in the appended claims.

Such an improved solution has now been devised.

Thus, in accordance with the present invention there are provided systems and methods as defined in the appended claims.

In accordance with the invention there may be provided a computer-implemented method for a node of a blockchain network, the computer-implemented method comprising: establishing a cryptographically protected communications session with a computing entity; receiving, via the cryptographically protected communications session, a communication comprising input data that controls execution of a program published to a blockchain network; receiving a first attestation that a set of communications occurred via the cryptographically protected communications session, the set of communications comprising the data; generating, based at least in part on the received input data: a proof of correct execution of the program and a second attestation that the data was received from the data source; and providing the proof of correct execution of the program to another computer system.

Additionally or alternatively the invention may be described as comprising the steps:
  establishing a cryptographically protected communications session with a computing entity;
  receiving, via the cryptographically protected communications session, a communication comprising input data that controls execution of a program published to a blockchain network;
  receiving a first attestation that a set of communications occurred via the cryptographically protected communications session, the set of communications comprising the data;
  generating, based at least in part on the received input data:
    a proof of correct execution of the program; and
    a second attestation that the data was received from the data source; and
  providing the proof of correct execution of the program to another computer system.

The first attestation may have a value based at least in part on a root node of a Merkle tree, the Merkle tree comprising a set of leaf nodes determined from the set of communications and a set of salt values.

Communications of the set of communications may have corresponding intermediate nodes determined based on whether the communication was received or transmitted. In some cases, each communication of the set of communications has such a corresponding intermediate node.

The value of first attestation is based further at least in part on a cryptographic hash output generated from at least the root node of the Merkle tree and a time interval of the set of communications. An example of a cryptographic hash algorithm suitable for generating the cryptographic hash output is a SHA-256 cryptographic hash algorithm.

The second attestation may be based at least in part on a Merkle path of the Merkle tree, the Merkle path comprising values of a set of nodes of the Merkle tree, the values of the set of nodes sufficient to compute the root node value of the Merkle tree.

Preferably, the set of nodes of the Merkle path comprise at most one node at each non-leaf and non-root depth of the Merkle tree. In some cases, the Merkle path comprises exactly one node at each non-leaf and non-root depth of the Merkle tree.

The program may comprise a set of rules agreed upon by two or more parties and the method may comprise selecting the computing entity to establish the cryptographically protected communications with from one or more computing entities trusted by at least one of the two parties.

Preferably, the method may include detecting a blockchain transaction comprising a first transaction output and a second transaction output, where the first transaction output comprises a first locking script, wherein a first digital asset associated with the first transaction output is unlockable by an unlocking script that encodes: a public key associated with the computing entity; a digital signature encoding an expected value, authenticity of the digital signature cryptographically verifiable using the public key, and authentication information usable to generate the expected value; and the second transaction output encodes an indication of the proof of correct execution is valid; and unlocking the first digital asset by providing at least the public key, the digital signature, and the authentication information.

The blockchain transaction may further comprise a transaction input digitally signed using a private key associated with the other computer system; a third transaction output comprising a second unlocking script, wherein a second digital asset associated with the third transaction output is unlockable using the private key; and the second transaction output further encodes an identifier associated with the other computer system.

Preferably, the authentication information comprises a Merkle path of a Merkle tree and the expected value is based at least in part on a root node of the Merkle tree.

The data may comprise binary data indicating whether an event occurred or not.

The data may be data that comprises information whose veracity is not verifiable based on other data on the blockchain.

Preferably, the first attestation is a digital signature, authenticity of the digital signature verifiable using a cryptographic public key associated with the computing entity.

It is also desirable to provide a system, comprising: a processor; and memory including executable instructions that, as a result of execution by the processor, causes the system to perform any of the methods as claimed.

It is also desirable to provide a non-transitory computer-readable storage medium having stored thereon executable instructions that, as a result of execution by one or more processors of a computer system, cause the computer system to at least perform any of the methods as claimed.

Additionally or alternatively, the invention may provide an improved blockchain programming tool or aid. It may provide an improved, efficient, and optimised arrangement that facilitates or enables distributed, verifiable computation.

BRIEF DESCRIPTION OF THE DRAWINGS

These and other aspects of the present invention will be apparent from and elucidated with reference to, the embodiment described herein. An embodiment of the present invention will now be described, by way of example only, and with reference to the accompany drawings, in which.

DETAILED DESCRIPTION

Figure 1:
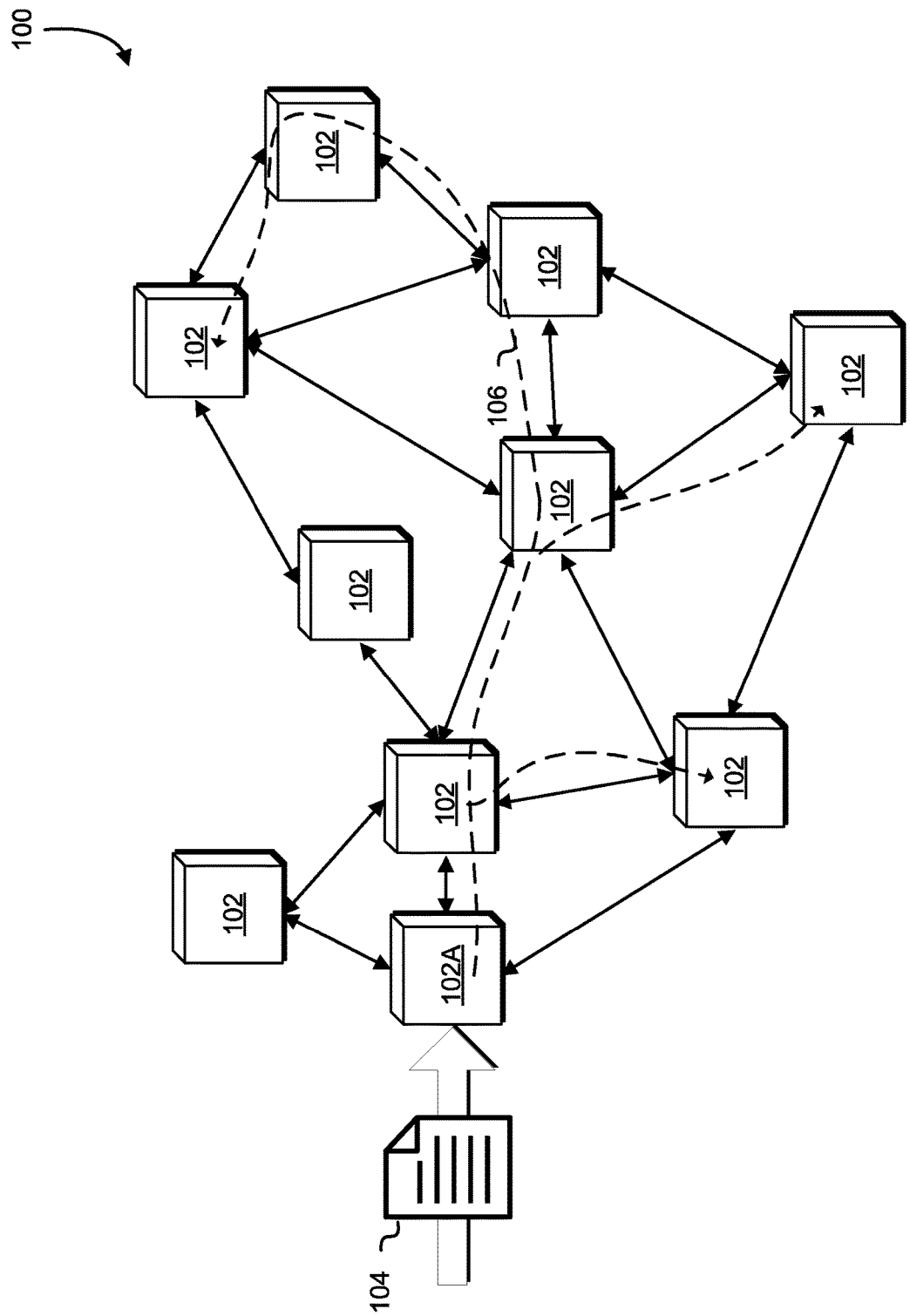
FIG. 1 illustrates a blockchain environment in which various embodiments can be implemented.

Reference will first be made to FIG. 1, which illustrates an example blockchain network 100 associated with a blockchain in accordance with an embodiment of the present disclosure. In the embodiment, the example blockchain network 100 comprises blockchain nodes that are implemented as peer-to-peer distributed electronic devices, each running an instance of software and/or hardware that performs operations that follow a blockchain protocol that is, at least in part, agreed to among operators of nodes 102. In some examples, "nodes" refers to peer-to-peer electronic devices that are distributed among the blockchain network. An example of a blockchain protocol is the Bitcoin protocol.

Figure 8:
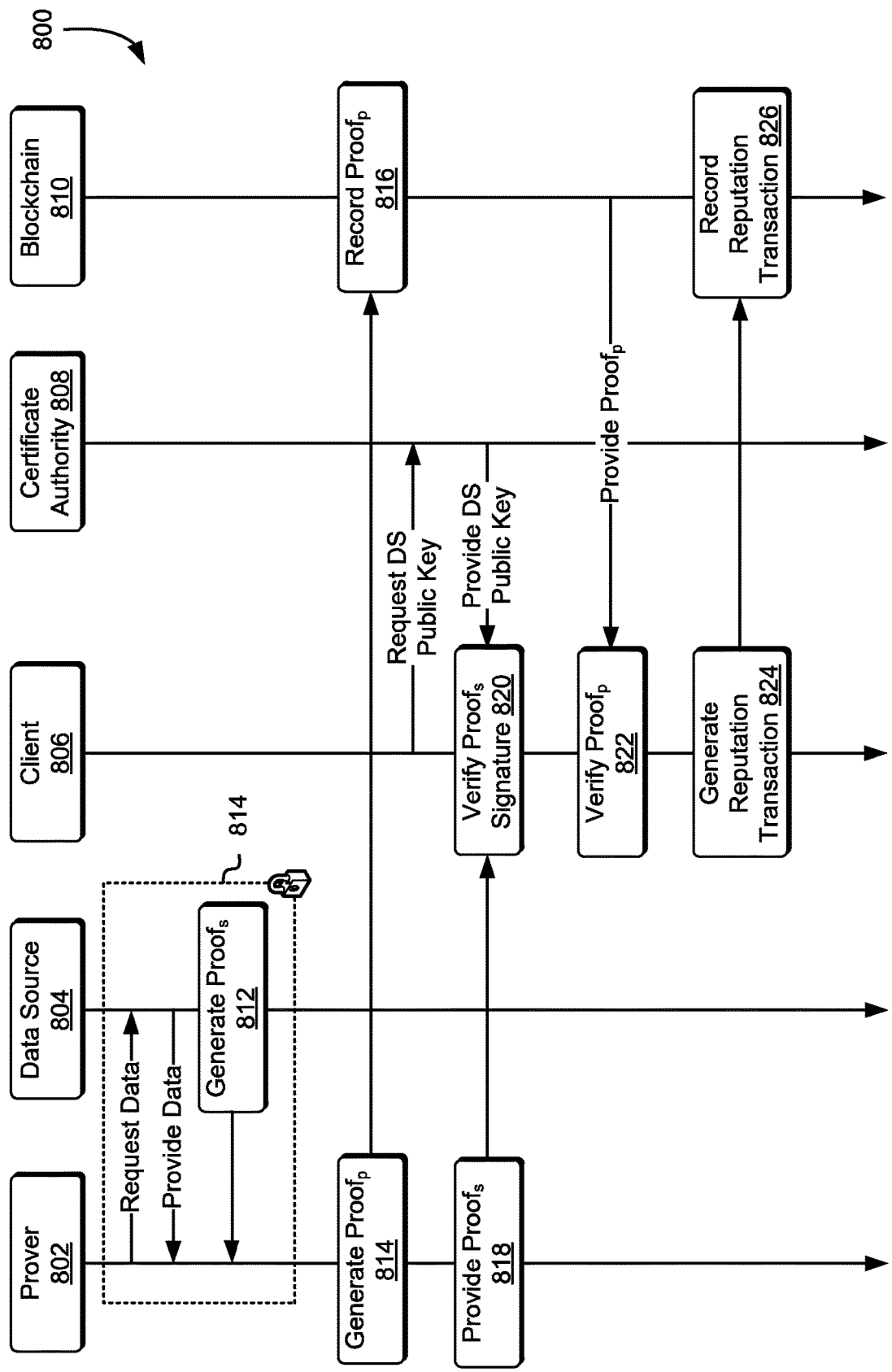
FIG. 8 illustrates a diagram of a protocol for generating and verifying proofs utilized in connection with various embodiments.

In some embodiments, the nodes 102 can be comprised of any suitable computing device (e.g., by a server in a data centre, by a client computing device (e.g., a desktop computer, laptop computer, tablet computer, smartphone, etc.), by multiple computing devices in a distributed system of a computing resource service provider, or by any suitable electronic client device such as the computing device 800 of FIG. 8). In some embodiments, the nodes 102 have inputs to receive data messages or objects representative of proposed transactions, such as a transaction 104. The nodes, in some embodiments, are be queryable for information they maintain, such as for information of a state of the transaction 104.

As shown in FIG. 1, some of the nodes 102 are communicatively coupled to one or more other of the nodes 102. Such communicative coupling can include one or more of wired or wireless communication. In the embodiment, the nodes 102 each maintain at least a portion of a "ledger" of all transactions in the blockchain. In this manner, the ledger would be a distributed ledger. A transaction processed by a node that affects the ledger is verifiable by one or more of the other nodes such that the integrity of the ledger is maintained.

As for which nodes 102 can communicate with which other nodes, it can be sufficient that each of the nodes in the example blockchain network 100 are able to communicate with one or more other of the nodes 102 such that a message that is passed between nodes can propagate throughout the example blockchain network 100 (or some significant portion of it), assuming that the message is one that the blockchain protocol indicates should be forwarded. One such message might be the publication of a proposed transaction by one of the nodes 102, such as node 102A, which would then propagate along a path such as a path 106. Another such message might be the publication of a new block proposed for inclusion onto a blockchain.

In an embodiment, at least some of the nodes 102 are miner nodes that perform complex calculations, such as solving cryptographic problems. A miner node that solves the cryptographic problem creates a new block for the blockchain and broadcasts the new block to others of the nodes 102. The others of the nodes 102 verify the work of the miner node and, upon verification, accept the block into the blockchain (e.g., by adding it to the distributed ledger of the blockchain). In some examples, a block is a group of transactions, often marked with a timestamp and a "fingerprint" (e.g., a hash) of the previous block. In this manner, each block may become linked to a previous block, thereby creating the "chain" that links the blocks in the blockchain. In embodiments, valid blocks are added to the blockchain by a consensus of the nodes 102. Also in some examples, a blockchain comprises a list of validated blocks.

In an embodiment, at least some of the nodes 102 operate as validating nodes that validate transactions as described in the present disclosure. In some examples, a transaction includes data that provides proof of ownership of a digital asset (e.g., a number of Bitcoins) and conditions for accepting or transferring ownership/control of the digital asset. In some examples, an "unlocking transaction" refers to a blockchain transaction that reassociates (e.g., transferring ownership or control) at least a portion of a digital asset, indicated by an UTXO of a previous transaction, to an entity associated with a blockchain address. In some examples, a "previous transaction" refers to a blockchain transaction that contains the UTXO being referenced by the unlocking transaction. In some embodiments, the transaction includes a "locking script" that encumbers the transaction with conditions that must be fulfilled before ownership/control can be transferred ("unlocked").

In some embodiments, the blockchain address is a string of alphanumeric characters that is associated with an entity to which control of at least a portion of a digital asset is being transferred/reassociated. In some blockchain protocols implemented in some embodiments, there is a one-to-one correspondence between a public key associated with the entity and the blockchain address. In some embodiments, validation of transactions involves validating one or more conditions specified in a locking script and/or unlocking script. Upon successful validation of the transaction 104, the validation node adds the transaction 104 to the blockchain and distributes it to the nodes 102.

Systems and methods described herein relate to enabling a locking script to secure the verification key $V_K$ from alteration and checking validity of a proof it, thereby allowing execution of a zero-knowledge protocol on a blockchain during transaction validation.

A verifiable computation is a technique that allows the generation of proofs of computation. In an embodiment, such a technique is utilized by a client to outsource, to another computing entity referred to herein as a prover, evaluation of a function $f$ on an input x. In some cases, the client is computationally limited so that it is infeasible for the client to perform the evaluation of the function (e.g., the expected runtime of the calculation using computing resources available to the client exceeds a maximum acceptable threshold), although such need not be the case, and the client may, generally speaking, delegate evaluation of the function $f$ on the input x based on any suitable criterion, such as computational runtime, computational cost (e.g., the financial cost of allocating computing resources to perform the evaluation of the function), and more.

A prover, in an embodiment, is any suitable computing entity such as a blockchain node as described in greater detail elsewhere in the present disclosure. In an embodiment, a prover (e.g., a blockchain node) evaluates the function $f$ on input x and generates an output y and a proof $\pi$ of the correctness of the output y that can be verified by other computing entities such as the client as described above and/or other nodes of the blockchain network. Proofs, which may also be referred to as arguments, can be verified faster than doing the actual computational—accordingly, computational overhead can be reduced (e.g., reducing power overhead and the cost associated with powering and running computing resources) by verifying the correctness of the proof instead of re-computing the function $f$ over input x to determine the correctness of the output generated by the prover described above. In zero-knowledge verifiable computation the prover provides an attestation to the client that the prover knows an input with a particular property.

An efficient variant of a zero-knowledge proof of knowledge is zk_SNARK (Succinct Non-interactive ARgument of Knowledge). In an embodiment, all pairings-based zk-SNARKs include a process where the prover computes a number of group elements using generic group operations and the verifier checks the proof using a number of pairing product equations. In an embodiment, the linear interactive proof works over a finite field and the prover's and verifier's message include, encode, reference, or otherwise include information usable to determine vectors of field elements.

In an embodiment, systems and methods described herein allow mining node of a blockchain to perform a computation (e.g., evaluation of function $f$ on input x) once and generate a proof that can be used to verify correctness of the output wherein evaluating correctness of the proof is computationally less expensive than evaluating the function. In this context, the cost (i.e., how expensive) of operations and tasks may refer to the computational complexity of performing the operation or task. In an embodiment, computational complexity refers to the average computational cost or the worst-case computational cost of performing the sorting algorithm—for example, a heapsort algorithm and a quicksort algorithm both have an average computational cost of $O(n \log n)$, but quicksort has a worst-case computational cost of $O(n^2)$ whereas heapsort has a worst-case computational cost of $O(n \log n)$. In an embodiment, the average computational cost and/or the worst-case computational cost of evaluating the function $f$ on input x is worse than that of evaluating correctness of the proof. Accordingly, the use of systems and methods described herein are highly advantageous and, may, for example, allow for more computationally expensive contracts to be run as such contacts would not increase the time required to validate the blockchain proportionally. Further advantages may include reduction in power consumption of verifier systems, thereby improving the efficiency of verifier computer systems and reducing the energy costs associated with running such verifier computer systems in evaluating correctness of proofs.

In an embodiment, a verification key $V_K$ or portions thereof can be extracted from public parameters generated in a setup phase of a zero-knowledge protocol and used together with a proof π, and the input/output data to verify the alleged proof of correctness computation provided by a prover. For example, as described in greater detail above and below, systems and methods that allow a locking script secures the verification key $V_K$ from alteration and checks the validity of the proof it, allowing the execution of a zero-knowledge protocol on blockchain during transaction validation. Accordingly, the present disclosure presents systems and methods to execute the verification phase using blockchain scripts (e.g., in a Bitcoin-based network) for storing the elements used in the verification of the computation.

Figure 2:
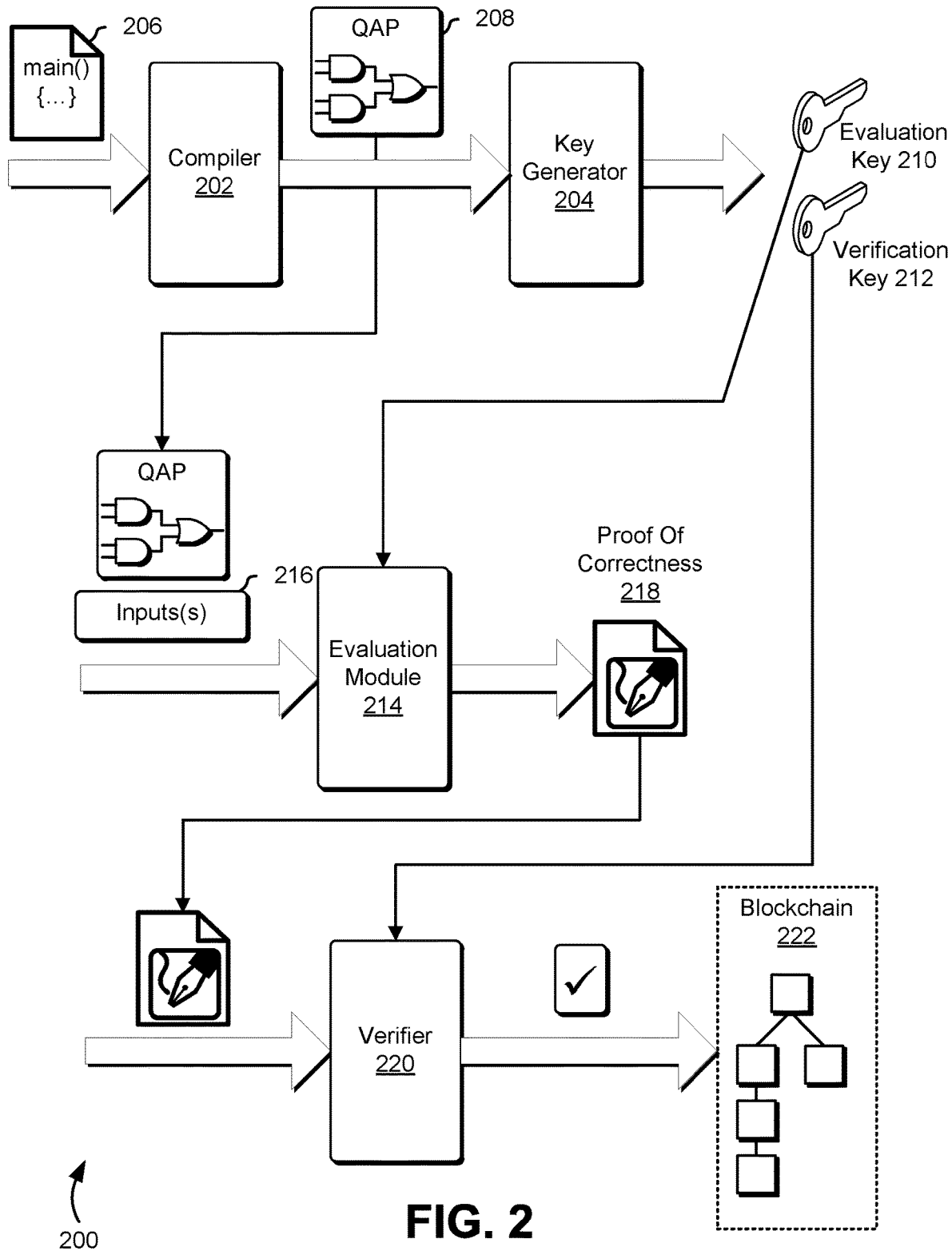
FIG. 2 illustrates a computing environment which may be utilized to implement a protocol in accordance with various embodiments.

FIG. 2 illustrates a computing environment 200 which may be utilized to implement a protocol in accordance with various embodiments. The protocol may be implemented using blockchain technologies to store proof-of-correctness and combine the "correct-by-construction" cryptography approach with smart contracts. In an embodiment, a public verifiable computation scheme comprises three phases: a setup phase, a computation phase and a verification phase.

A setup phase may be performed as part of a process to outsource the performance of computational tasks. A client, as referred to below, may refer to an entity such as a customer or client computer system that delegates performance of a computational task to a prover, which may be a different computer system. Clients may, generally speaking, delegate the performance of computational tasks for a variety of reasons, including but not limited to limited computing resources, lack of computing resources, financial costs associated with utilizing a client computer system to perform the task, energy costs associated with utilizing a client computer system to perform the task (e.g., a mobile device or laptop that relies on a battery for power may utilize a prover to perform computationally intensive tasks, thereby saving power and prolonging the usage of the battery-powered device), and more.

In an embodiment, the setup phase involves a client, customer, employee of an organization, or any other suitable entity writing contracts in a formal language with precise semantics. The contract may be written in a high-level programming language such as C or Java. Generally speaking, contracts may be expressed in any language or syntax that is or can be converted to a format that can be manipulated by a computer system. In an embodiment, a domain specific language, with a limited purpose, may provide type-safety and restricted expressivity may be utilized. The source code generated may be a precise description of a contract.

The compiler 202 may be any hardware, software, or a combination thereof that includes executable code that, if executed by one or more processors of a computer system, causes the system to take, as input, the source code 206 and produces a circuit. A compiler 202 may refer to a computer program that executes or performs instructions based on instructions that have been compiled into a machine-readable format such as binary code. It should be noted that while a compiler 202 is illustrated, interpreters, assemblers, and other suitable software and/or hardware component may be utilized to convert the source code to a circuit. In an embodiment, the circuit is an arithmetic circuit that comprises wires that carry values from a field F and connect to logical and/or arithmetic gates. In an embodiment, the circuit C is used by the system to generate a quadratic program Q 208 that comprises a set of polynomials that provide a complete description of the original circuit C.

In an embodiment, the compiler 202 is able to recognise a substantial subset of a programming language such as C or Java including but not limited to: pre-processor directives, static initializers, global and local functions, block-scoped variables, arrays, data structures, pointers, function calls, function operators (e.g., functors), conditionals and loops, and arithmetic and bitwise Boolean operators. In an embodiment, the compiler 202 does not support the entire set of commands in accordance with standards of the programming language (this may, in some cases, be intended to prevent certain types of algorithms from being executed in a smart contract, such as to prohibit recursive algorithms). In an embodiment, the compiler expands expressions of the source code into an arithmetic gate language to produce an arithmetic circuit. Circuit implementations have been contemplated in the past by Campanelli, M., et al. (2017) in "Zero-Knowledge Contingent Payments Revisited: Attacks and Payments for Services" and by Tillich, S. and Smart, B in "Circuits of Basic Functions Suitable For MPC and FHE." The arithmetic circuit may be utilized to build a Quadratic Arithmetic Problem (QAP) by the compiler 202 or any other suitable hardware, software, or combination thereof (e.g., a software module not illustrated in FIG. 2). The quadratic program is compiled into a set of cryptographic routines for the client (e.g., key generation and verification) and the prover (e.g., computation and proof generation) in accordance with an embodiment.

In an embodiment, the key generator 204 is hardware, software, or a combination thereof that includes executable code which, if executed by one or more processors of a computer system, causes the system to generate an evaluation key and a verification key form a quadratic program. Techniques for encoding computations as quadratic programs are contemplated in "Quadratic Span Programs and Succinct NIZKs without PCPs" by Gennaro, R., et al. (2013). In an embodiment, the quadratic arithmetic problem (QAP) Q encodes the circuit C over a field F and contains a set of m+1 polynomials:

$$V=\{v_k(x)\}, W=\{w_k(x)\}, Y=\{y_k(x)\}$$

with 0≤k≤m. A target polynomial t(x) is also defined. Given a function f that takes n elements of F as input and outputs n' elements, with N=n+n', then Q computes f if $\{c_1, \ldots, c_N\} \in F^N$ is a valid assignment of the group of input and outputs of f and if there exists a list of coefficients $\{c_{N+1}, \ldots, c_m\}$ such that t(x) divides p(x):

$$p(x) = \left(v_0(x) + \sum_{k=1}^{m} c_k \cdot v_k(x)\right) \cdot \left(w_0(x) + \sum_{k=1}^{m} c_k \cdot w_k(x)\right) - \left(y_0(x) + \sum_{k=1}^{m} c_k \cdot y_k(x)\right)$$

Therefore, in an embodiment, there must exist some polynomial h(x) such that h(x)·t(x)=p(x). The size of Q is m, and its degree is the degree of t(x).

In an embodiment, building a QAP for an arithmetic circuit comprises pick an arbitrary root $r_g \in F$ for each multiplication gate g in the circuit and defining the target polynomial to be $t(x)=\Pi_g(x-r_g)$. In an embodiment, an index k∈{1 . . . m} is associated to each input of the circuit and to each output from a multiplication gate. The polynomials in V encode the left input into each gate, the W encode the right input into each gate, and the Y encode the outputs. For instance, $v_k(r_g)=1$ if the k-th wire is a left input to gate g, and $v_k(r_g)=0$ otherwise. Therefore, for a particular gate g and its root $r_g$, the previous Equation can be simplified as follows:

$$(\Sigma_{k=1}^{m} c_k \cdot v_k(r_g)) \cdot (\Sigma_{k=1}^{m} c_k \cdot w_k(r_g)) = (\Sigma_{k \in I_{left}} c_k) \cdot (\Sigma_{k \in I_{right}} c_k) = c_g \cdot y_k(r_g) = c_g$$

The output value of the gate is equal to the product of its inputs. The divisibility check decomposes into deg(t(x)) separate checks, one for each gate g and root $r_g$ of t(x), such that $p(r_g)=0$. Addition gates and multiplication-by-constant gates do not contribute to the size or degree of the QAP.

In an embodiment, the QAP is defined over a field Fp, where p is a large prime. In an embodiment, it is desirable that QAP over Fp efficiently computes any function that can be expressed in terms of addition and multiplication modulo p. An arithmetic split gate may be designed to translate an arithmetic wire $a \in Fp$, known to be in $[0, 2^{k-1}]$, into k binary output wires. Accordingly, it follows that, Boolean functions can be expressed using arithmetic gates. For instance, NAND(a,b)=1−ab. Each embedded Boolean gate costs only one multiply. Moreover, new gates such as split can be defined as standalone and composed with other gates. Given input $a \in F_p$ known to be in $[0, 2^{k-1}]$, the split gate outputs k wires holding the binary digits $\alpha_1, \ldots \alpha_k$ of a such $\Sigma^k 2^{i-1} \alpha_i = a$ and each $\alpha_i$ is either 0 or 1.

Finally, the public parameters to be used by all provers and verifiers are generated by the system as part of the setup phase. It should be noted that the evaluation key $E_K$ and the verification key $V_K$ are derived using a secret value selected by the client. A key generator 204 may utilize the quadratic arithmetic program (QAP) in connection with the key generation algorithm to generate the evaluation key $E_K$ 210 and the verification key $V_K$ 212.

In an embodiment, performing a computational task involves the computation of a function on an input 216 (i.e., a process for evaluating f(x)) by a prover. In an embodiment, the prover is any suitable computer system that the client may delegate a computational task to. The input 216, in an embodiment, includes information that attests to the prover's identity, such as a digital signature generated using a private key associated with the prover. In an embodiment, the prover is a computer system that the client transfers digital assets to as a result of successful. The client, in an embodiment provides an input x and the evaluation key $E_K$ to a prover, the prover uses the evaluation module 214 to a compute routine to compute the output y (i.e., y=f(x) wherein the input is x and the function is f) and uses the evaluation key $E_K$ 210 to produce a proof-of-correctness 218. The evaluation module, in an embodiment, is hardware and/or software that includes instructions that, if executed by one or more processors of a computer system, cause the computer system to evaluate the values of the internal circuit wires of the QAP 208 and produce an output y of the QAP.

In an embodiment, each polynomial $v_k(x \in F)$ of the quadratic program is mapped to an element $g^{v_k(s)}$ in a bilinear group, where s is a secret value selected by the client, g is a generator of the group, and F is the field of discrete logarithms of g. In an embodiment, for a given input, the prover evaluates the circuit to obtain the output and the values of the internal circuit wires, which correspond to the coefficients $c_i$ of the quadratic program. Accordingly, a prover can evaluate $v(s) = \Sigma k \in \{m\} c_k \cdot v_k(s)$ to get $g^{v(s)}$; compute w(s) and y(s); compute $h(x)=p(x)|t(x)=\Sigma^d h_i \cdot x^i$; and compute $g^{h(s)}$ using the $h_i$ and $g^{s(i)}$ terms in the evaluation key. In an embodiment, the proof-of-correctness 218 comprises $(g^{v(s)}, g^{w(s)}, g^{y(s)}, g^{h(s)})$ and a verifier uses the bilinear map to check that $p(s)=h(s) \cdot t(s)$. In an embodiment, the proof π is stored on the blockchain 222 for later use or can be verified by multiple parties without requiring the prover to separately interact with each of these. In an embodiment, the evaluation of the circuit storage of the proof-of-correctness may be performed to unlock resources (e.g., digital assets) encumbered by a locking script of a transaction.

In an embodiment, the proof π is broadcast to a blockchain network and a verifier 220 is used to verify the proof. In an embodiment, the verifier 220 is any suitable computing entity, such as a node on a blockchain. It should further be noted that in some cases, the same computing entity that generates the evaluation key $E_K$ and verification key $V_K$ also verifies the proof. In an embodiment, nodes of blockchain can validate a locking transaction using the verification key $V_K$ and the proof π, thus validating the contract if the verification succeeds. One requirement of the protocol is that the prover cannot provide incorrect proofs, even when it knows the verification key $V_K$. Thus, in this protocol, a common reference string (CRS) is produced by the client or by a trusted third party who publishes at least the evaluation key $E_K$ and verification key $V_K$. In an embodiment, the published verification key $V_K$ can be used by any computing entity to verify computations.

Using techniques described herein, a client is able to partially obfuscate transaction data, such as the identity of the recipients of a blockchain transaction. In an embodiment, the unlocking script does not expose the recipient's address and the recipient's public key. However, in some cases, the value of the transaction (e.g., amount of digital assets transferred) may be visible to nodes of the blockchain network. In an embodiment, cryptographic techniques as described above and below are utilized by the client to covert locking scripts into quadratic arithmetic programs and the prover to solve arithmetic programs to generate proofs.

Generally speaking, a client is able to use standard transactions (e.g., standard transactions as defined in a Bitcoin-based blockchain network) such as P2PK and P2PKH to pay a counterparty or prover. For example, in an embodiment, a client converts a P2PK locking script into an arithmetic circuit and broadcasts a locking transaction that includes a puzzle derived from the circuit. A counterparty or prover receives the circuit, provides an appropriate input (e.g., information that attests to the prover's identity such as a shared secret between the client and the prover or a digital signature generated using the prover's private key) and runs the circuit to generate a proof-of-correctness π. In an embodiment, the proof is used to unlock resources (e.g., digital assets), and furthermore, it may be the case that information identifying the counterparty or prover (e.g., a public key and/or digital signature associated with the counterparty or prover) is not recorded to the blockchain in an unobfuscated format.

In an embodiment, the verification key and the corresponding proof are generated according to techniques described above and/or below. Accordingly, a verifier is given verification key $V_K$ and proof π:

$$V_K = \begin{Bmatrix} \mathcal{P} \\ \mathcal{Q} \\ \alpha_v \mathcal{Q} \\ \alpha_w \mathcal{Q} \\ \alpha_w \mathcal{P} \\ \alpha_y \mathcal{Q} \\ \beta \mathcal{P} \\ \beta \mathcal{Q} \\ r_y t(s)\mathcal{P} \\ r_v v_i(s)\mathcal{P} \\ r_w w_i(s)\mathcal{Q} \\ r_y y_i(s)\mathcal{P} \end{Bmatrix}_{i=0 \ldots N}$$

$$\text{Proof } \pi = \begin{Bmatrix} \sum_{i=N+1}^{m} a_i r_v v_i(s)\mathcal{P} \\ \sum_{i=N+1}^{m} a_i \alpha_v r_v v_i(s)\mathcal{P} \\ \sum_{i=N+1}^{m} a_i r_w w_i(s)\mathcal{Q} \\ \sum_{i=N+1}^{m} a_i \alpha_w r_w w_i(s)\mathcal{P} \\ \sum_{i=N+1}^{m} a_i r_y y_i(s)\mathcal{P} \\ \sum_{i=N+1}^{m} a_i \alpha_y r_y y_i(s)\mathcal{P} \\ \sum_{i=N+1}^{m} a_i (r_v \beta v_i(s) + r_w \beta w_i(s) + r_y \beta y_i(s))\mathcal{P} \\ \sum_{i=0}^{d} h_i s^i \mathcal{Q} \end{Bmatrix}$$

such that the verifier computes a plurality of elliptic curve multiplications (e.g., one for each public input variable) and five pair checks, one of which includes an additional pairing multiplication.

Given verification key $V_K$, proof $\pi$, and $(a_1, a_2, a_N)$, to verify that $t(x)$ divides $p(x)$ and hence $(x_{N+1}, \ldots, x_m) = f(x_0, \ldots, x_N)$, the verifier proceeds as follows. First it checks all the three $\alpha$ terms:

$$e(\alpha_v r_v V_{mid}(s)\mathcal{P}, \mathcal{Q}) = e(r_v V_{mid}(s)\mathcal{P}, \alpha_v \mathcal{Q})$$

$$e(\alpha_w r_w W_{mid}(s)\mathcal{P}, \mathcal{Q}) = e(\alpha_w \mathcal{Q}, r_w W_{mid}(s)\mathcal{Q})$$

$$e(\alpha_y r_y Y_{mid}(s)\mathcal{P}, \mathcal{Q}) = e(r_y Y_{mid}(s)\mathcal{P}, \alpha_y \mathcal{Q})$$

wherein $V_{mid}(s) = \sum_{i=N+1}^{m} a_i v_i(s)$, $W_{mid}(s) = \sum_{i=N+1}^{m} a_i w_i(s)$, and $Y_{mid}(s) = \sum_{i=N+1}^{m} a_i y_i(s)$. Then, the verifier checks the terms $\beta$:

$$e(r_v V_{mid}(s)\mathcal{P} + r_y Y_{mid}(s)\mathcal{P}, \beta \mathcal{Q}) \cdot e(\beta \mathcal{P}, r_w W_{mid}(s)\mathcal{Q}) = e(Z_{mid}(s)\mathcal{P}, \mathcal{Q})$$

and $Z_{mid}(s) = \sum_{i=N+1}^{m} a_i(r_v \beta v_i(s) + r_w \beta w_i(s) + r_y \beta y_i(s))$. Finally, the verifier checks the divisibility requirement:

$$e(r_v V(s)\mathcal{P}, r_w W(s)\mathcal{Q}) = e(r_y Y(s)\mathcal{P}, \mathcal{Q}) \cdot e(r_y t(s)\mathcal{Q}, h(s)\mathcal{Q})$$

wherein $r_v V(s)\mathcal{P} = \sum_{i=0}^{m} r_v a_i v_i(s)\mathcal{P}$, $r_w W(s)\mathcal{Q} = \sum_{i=0}^{m} r_w a_i w(s)\mathcal{Q}$, $r_y Y(s)\mathcal{P} = \sum_{i=0}^{m} r_y a_i y(s)\mathcal{P}$, and $h(s)\mathcal{Q} = \sum_{i=0}^{d} h_i \mathcal{Q}$.

Thus, upon considering the notation from the sections described above and the examples described in this disclosure, the verification comprises a set of pair checks of the following elements, in accordance with one embodiment:

$$e(\pi_2, V_K^2) = e(\pi_1, V_K^3)$$

$$e(\pi_4, V_K^2) = e(V_K^5, \pi_3)$$

$$e((\pi_1 + \pi_6), V_K^2) = e(\pi_7, V_K^2)$$

$$e((\alpha_0 V_K^{10} + \alpha_1 V_K^{11} + \alpha_2 V_K^{12} + \alpha_3 V_K^{13} + \alpha_4 V_K^{14} + \pi_2 + \alpha_7 V_K^{15}), (\alpha_0 V_K^{16} + \alpha_1 V_K^{17} \alpha_2 V_K^{18} + \alpha_3 V_K^{19} + \alpha_4 V_K^{20} + \pi_4 + \alpha_7 V_K^{21})) = e((\alpha_0 V_K^{22} + \alpha_1 V_K^{23} + \alpha_2 V_K^{24} + \alpha_3 V_K^{25} + \alpha_4 V_K^{26} + \pi_6 + \alpha_7 V_K^{15}), V_K^2) * e(V_K^9, \pi_8)$$

Figure 3:
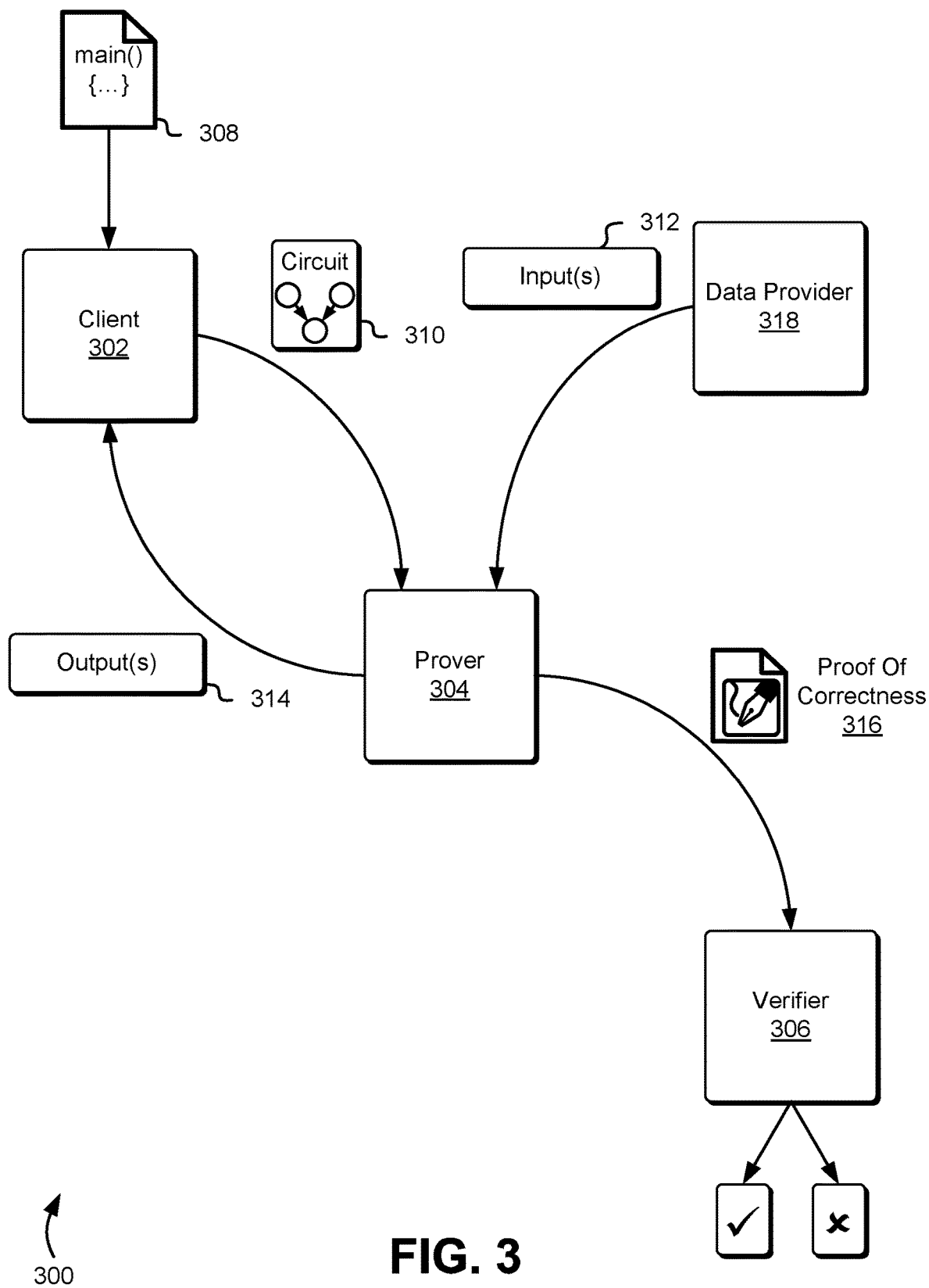
FIG. 3 illustrates a diagram of an environment suitable for performance of a verifiable computation.

FIG. 3 illustrates a diagram 300 for coordinating the performance of a verifiable computation. The client 302, prover 304, and verifier 306 may be nodes of a blockchain network. The client 302 may be any suitable computer system any may include executable code which, if executed by one or more processors of a computer system, causes the computer system to receive a smart contract 308. In an embodiment, the smart contract 308 is encoded in a high-level programming language as source code such as C, C++, or Java. In an embodiment, software such as a compiler, interpreter, and/or assembler may be utilized to transform the smart contract 308 to an arithmetic circuit 310 which consists of "wires" that carry values from a field IF and connect to addition and multiplication gates. It should be noted that the arithmetic circuit may refer to a logical circuit that can be implemented by a physical circuit comprising a series of physical gates (e.g., using transistor—transistor logic (TTL) integrated circuits such as 7400-series gates, flip-flops, buffers, decoders, multiplexers, and the like) connected by physical wires. While the execution of a smart contract 308 is described in the context of FIG. 3 and elsewhere, the use of a smart contract is merely one non-limiting example of source code that can be transformed to an arithmetic circuit. In an embodiment, a client 302 (e.g., alone or in conjunction with another entity) determines source code for performing a task defined by a set of operations, wherein execution of the task is delegated to a prover 304. Generally speaking, a verifier 306 may perform tasks associated with determining that the prover 304 executed the task correctly, such as by verifying the validity of a proof of correctness generated by the prover 304.

In an embodiment, the client 302 provides the prover 304 with an arithmetic circuit 310 and a data provider 318 provides the prover with an input 312 to the circuit. In some cases, the input 312 may be data such as data about the real-world state and events. The circuit 310 may be used to generate a quadratic program Q that comprises a set of polynomials that provide a complete description of the original circuit. In either case, the prover 304 may executes the circuit C or the quadratic program 2 on the input 312 to generate one or more outputs 314, intermediate outputs and one final output. In some embodiments, the prover is expected to obtain, as the output, a valid transcript for {C, x, y} that is an assignment of values to the circuit wires such that the values assigned to the input wires are those of x, the intermediate values correspond to the correct operation of each gate in C, and the values assigned to the output wire(s) is y; if the claimed output is incorrect (i.e., y≠P(x)), then a valid transcript for {C, x, y} does not exist. In an embodiment, the prover is expected to provide a subset of the values of the circuit wires, wherein the selected subset of the values of the circuit wires are not known to the prover a priori.

In embodiments, the output y, the values of the internal circuit wires (or a subset thereof), and the evaluation key $E_K$ are used to produce the proof-of-correctness 316. The proof π can be stored on the blockchain and verified by multiple parties without requiring the prover 304 to separately interact with the multiple parties. In this manner, a verifier 306 can validate the locking transaction using the public verification key $V_K$ and the proof π, thereby validating the contract. In some cases, the client 302 may reclaim digital assets encumbered by the locking transaction if the verification fails. In some cases, the verifier 306 and the client 302 are the same computer system.

Figure 4:
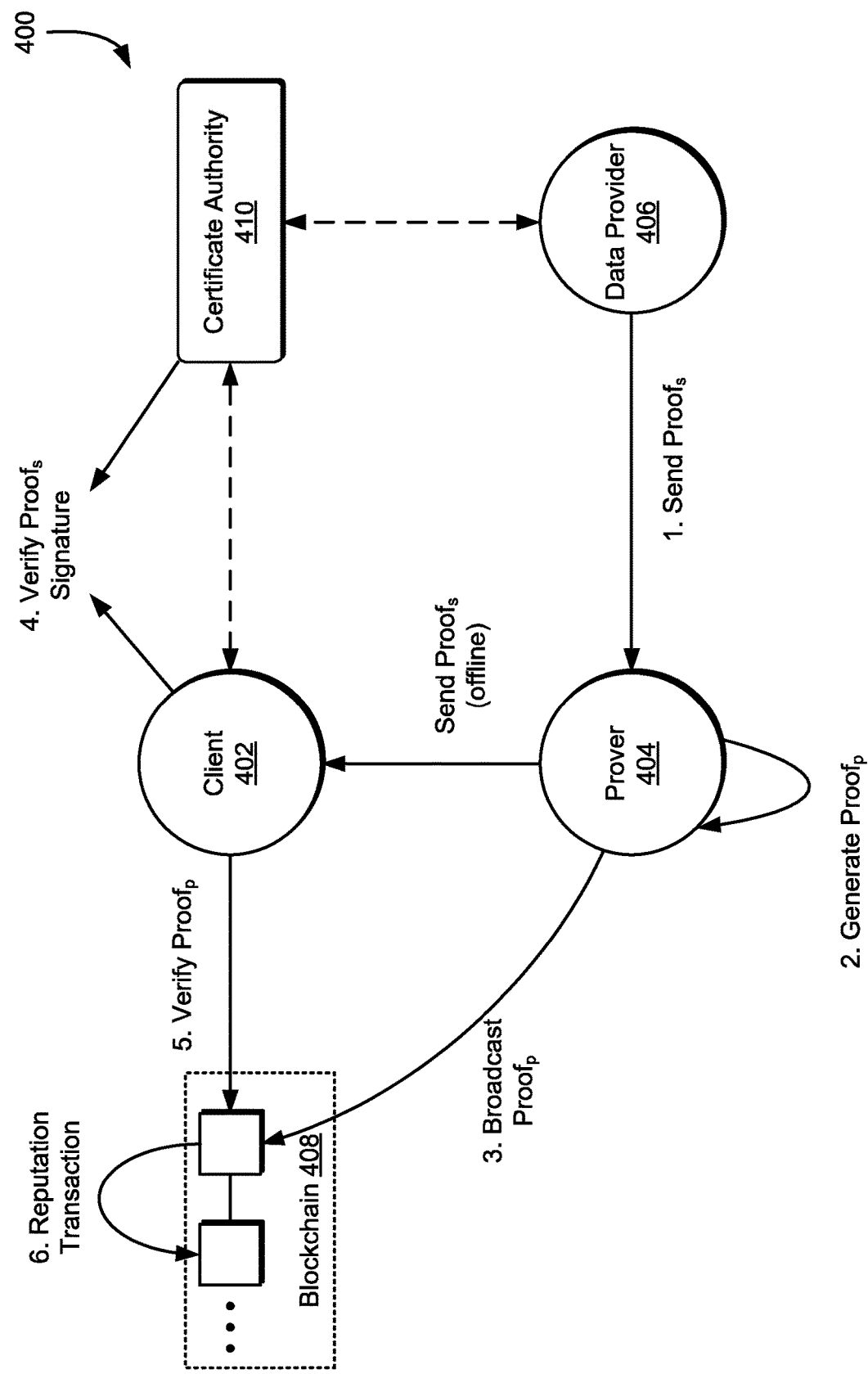
FIG. 4 illustrates an example diagram of an environment in which a prover utilizes data obtained from a data source in connection with the execution of a program or script.

FIG. 4 illustrates a diagram 400 of an embodiment of the present disclosure. Specifically, FIG. 4 illustrates an environment in which data provided by a data source is authenticated and utilized in the execution of a program or script such as a smart contract published to a blockchain network. In an embodiment, a client 402, a prover 404, and a data provider 406 are computer systems. In an embodiment, the client 402 refers to a computer system that outsources or delegates the performance of a computing task to another computer system, referred to herein as a prover. In an embodiment, the computational task refers to the evaluation of a function, the execution of a smart contract, and more. In an embodiment, performing a computational task involves the computation of an output based on a circuit and one or more inputs, the computation performed by a prover on behalf of a client. The circuit may be generated from source code that is a formal representation of the terms of a contract.

As described in greater detail elsewhere in this disclosure, a protocol for execution of smart contracts on a blockchain may utilize zero-knowledge proofs. In an embodiment, the execution of a smart contract can happen as part of the transaction validation. For this, the public parameters generated during the setup phase of the protocol are used together with the proof and the input/output data to verify the alleged proof of correct computation provided by the prover and validate the contract execution. The execution phase of a contract may, in some embodiments, rely on input/output data external to the blockchain. Generally speaking, external data refers to information that is not available on the blockchain or not verifiable from data accessible via the blockchain. External data may be obtained from various sources, such as data feeds and application programming interfaces (APIs). External data may be used in a variety of contexts surrounding smart contracts, including, but not limited to, smart contracts for use in securities (e.g., interest rate, derivatives, bonds) that require access to market price feeds for assets and financial applications (e.g., interest rates); peer-to-peer insurance smart contracts that require access to external data (e.g., flight information for which a party is insured against delays; weather data for financial derivatives contracts using a data feed of the weather instead of the price index for crop insurance); trade smart contracts that need GPS data about shipments; gambling contracts that require access to random number generators; and more.

In an embodiment, determining when and/or how to execute a smart contract relies on access to external data such as data about the real-world state and events. In an embodiment, the data provider 406 provides such data, and may be referred to, in some cases, as a smart oracle. Data returned by oracles can be in various formats and types, such as in the form of a Boolean that indicates whether certain information specified by the parties contains a specified text or specified information. In an embodiment, this data can be used to organize bets (e.g., the outcome of a binary event, such as the result of a boxing match). A floating-point value may be utilized in the context of exchange rates between currencies (including cryptocurrencies), and may be read from the API of some Bitcoin exchange. This type of data may be useful for organizing option and hedging contacts.

The data provider 406 may also be referred to as an oracle that retrieves and/or provides external data such as data about real-world state and events and makes the external data available to a blockchain. An oracle may refer to a computing entity that includes executable code that, if executed on one or more processors of a computer system, causes the computer system to generate data and/or a data feed that is compatible with a blockchain (e.g., Bitcoin, Ethereum, and others) that works as a trusted link between the blockchain and a network (e.g., Internet). The oracle may obtain data from websites, feeds, databases, and other data sources to provide external data to the blockchain. The external data may include, for example, temperature information, GPS coordinates of shipment, aviation information (e.g., flight status information), and more.

In an embodiment, a prover 404 obtains external data from a data provider 406 by: establishing a cryptographically protected communications session with the data provider; making a request via the cryptographically protected communications session; the data provider provides data in response to the request; the prover receives the data, and in response to receiving the data, requests an attestation of the communications between the parties; the data provider computes a cryptographically verifiable proof of communications $\pi_{Communications}$ between the prover and the data provider during the cryptographically protected communications session, and digitally signs the attestation with the data provider's private key; and the prover receives the proof of communications. Generally speaking, the proof of communications is a cryptographically verifiable attestation that one or more communications occurred between a client and server (e.g., between the prover and data provider). In an embodiment, the attestation can be used to verify the contents of the communications between the client and server, although it should be noted that in some cases, a portion of the communications may be redacted (e.g., information whose disclosure is subject to legal restrictions), such as by replacing the redacted information with an obfuscation of the information (e.g., the information in an encrypted or hashed format) or replaced with a predetermined default value. In an embodiment, the attestation is determined based at least in part on a root value of a Merkle tree, such as those described in accordance with FIG. 6. In an embodiment, the attestation (e.g., the proof of communications) is digitally signed using a cryptographic private key accessible to the data provider 406. An entity such as a certificate authority may issue a digital certificate that certifies a cryptographic public key corresponds to the private key. It should be noted that in the scope of this disclosure, a proof of communications is generally referred to using the notation $\pi_{Communications}$ whereas a proof of correct execution may be referred to as $\pi_{Prover}$ or, more simply, π.

A certificate authority 410 may refer to a computing entity that generates and/or distributes digital certificates that certify a particular cryptographic key belongs to a particular entity. For example, a digital certificate containing the data provider's public key may be obtained by a computing entity and such a public key may be utilized in various contexts—for example, to encrypt data for secure communications with the data provider, to verify authenticity of a digital signature that is purported signed by the data provider, and more. While FIG. 4 illustrates an embodiment in which the client 402 has a trust relationship with the certificate authority 410

(e.g., the client treats digital certificates properly signed and/or issued by the certificate authority as authentic), any suitable trusted computing entity may be utilized, such as a key management system or a key registry.

The prover 404, in an embodiment, utilizes the input data to produce a $\pi_{Prover}$, such as in the manner described above in connection with FIG. 2. In an embodiment, the $\pi_{Prover}$ is stored on the blockchain 408 for later use or can be verified by multiple parties without requiring the prover to separately interact with each of these. For example, the execution of a smart contract for insuring a party against flight delays may rely upon official flight data obtained from an official aviation authority (e.g., the Federal Aviation Administration of the United States or the Civil Aviation Authority of the United Kingdom) as an input data. Generally speaking, input data need not come from a government source—the parties of a smart contract may agree upon a list of entities from which the input data may be obtained from—accordingly, the data source may be any suitable computing entity that the client indicates is trusted for obtaining the data. A client may specify different lists of trusted entities for different inputs. The list of trusted entities may be selected and/or pruned based on the value of the contract.

The prover 404 may transmit the proof of communications to the client 402. In some cases, the data provider 406 may transmit the proof of communications to the client 402—for example, based on a command from the prover. As discussed previously, the proof of communications may be derived based at least in part on the root value of a Merkle tree. For example, the proof of communications may also encode information that specifies a time interval over which the communications occurred. In an embodiment:

$$W_{Time} = [T_{SessionStart}, T_{ProofRequest}]$$

$$\pi_{Communications} = H(h'_{final}, W_{Time})$$

In other words, the proof of communications is calculated using a cryptographic hash function wherein the root value of a Merkle tree ($h'_{final}$) and the time interval of the communications ($W_{Time}$ which, in an embodiment, encodes the start time of a cryptographically communications session and the time when a proof of the communications was requested) are inputs to the cryptographic hash function. In an embodiment, the inputs of a cryptographic hash function are concatenated or otherwise combined. The Merkle tree may be generated based at least in part from the records exchanged between the parties during the time interval indicated by $W_{Time}$. The proof of communications may be digitally signed using a cryptographic private key of the data source. In an embodiment, the time the conversation takes place is defined as $W_{Time} = [T_{SessionStart}, T_{ProofRequest}]$ and is included as part of the proof of communications generated by the server (e.g., the data source 504). It should be noted that, either in addition and/or as an alternative to transmitting the proof of communications to the client 402, the prover 404 may store the proof on a secure server (e.g., encrypted under a public key associated with the client 402) or in a data storage service of a computing resource service provider. In an embodiment, the client 402 stores the proof of communications in a data repository (e.g., a data storage service) and provides the client 402 with a uniform resource identifier (URI) or other suitable reference usable to obtain the proof of communications from the data repository. For example, a prover 402 that performs repeated tasks (e.g., capturing flight data for one or more routes over several days) aggregates the captured data to a container of a data repository such that a client can obtain the historical flight data (e.g., for a particular route) over a time interval.

In an embodiment, the client 402 receives a proof of communications and a digital signature over the proof of communications. The client may determine the digital signature is purportedly signed by the data provider, obtain the public key associated with the data provider (e.g., from a digital certificate issued by the certificate authority 410) and use the public key to verify authenticity of the digital signature. If the digital signature is determined to be authentic, the client 402 trusts that the proof of communications was generated by the data provider; if not, the proof of communications and digital signature may be discarded. After verifying the proof of communications, the client 402 may verify the proof of correctness, such as in the manner discussed in connection with FIGS. 2 and 3.

In some embodiments, the client 402 generates a reputation transaction that indicates that external data obtained from a particular prover 404 was correct (e.g., the data was the same data that was provided by a data provider). The reputation transaction may be mined to the blockchain 408 as a record of whether the prover 404 performed the computation task correctly and/or whether the prover 404 was honest with respect to using the external data received from the data provider to perform the computation of $\pi_{Prover}$. After a smart contract has been executed, a client can use $\pi_{Communications}$ to verify that the input data used to generate $\pi_{Prover}$ was the one provided by the data provider. A reputation transaction may be mined to the blockchain that indicates a review of the services provided by the prover—positive results may incentivize provers to act honestly and may be utilized to select provers for the execution of subsequent smart contracts. The reputation transaction may include a first unlocking script that allows the prover to unlock the reputation upon providing sufficient evidence that the input data used in $\pi_{Prover}$ came from the data provider and a second unlocking script that allows the client to revoke the review. The reputation transaction illustrated in FIG. 4 may be in accordance with those described elsewhere in this disclosure, such as those described, below, in connection with FIG. 9.

Generally speaking, in the context of FIG. 4, a client makes a request Req(src, τ, q) that specifies a target source src, a time τ, and a query q. If src is a web server, a cryptographically protected communications session such as a TLS session may be required. In an embodiment, any cryptographically protected communications session that provides cryptographically verifiable assurances of authenticity may be utilized, wherein messages between the parties are authenticated through message authentication codes (MACs) that are both generated and verified using the same secret key. This implies that the server and the recipient of the message must agree on the same key, thus any user who can verify a MAC is capable of generating MACs also for other messages. In contrast, digital signatures could provide that a certain message was signed by the holder of a certain private key. An approach to notarizing communications has been contemplated by Hajjeh and M. Badra in "TLS Sign" which defines a new sub-protocol called TLSSignOnOff where the client and the server notify a peer when they start or stop transmitting signed data. After a stop message, the server gathers a hash of the conversation and signs it. Various other approaches for notarizing record data (e.g., saving records of a session and signing the conversation with a cryptographically verifiable proof of the authenticity and/or integrity of the recorded conversation) of a cryptographically protected communications session can be used, such as techniques described by "R. Housley and M. Brown, "Transport Layer Security (TLS) Evidence Extensions" and by H. Ritzdorf, K. Wüst, A. Gervais, G. Felley, and S. Capkun, "TLS-N: Non-repudiation over TLS Enabling Ubiquitous Content Signing for Disintermediation" which define an evidence window that starts when the client makes a request and when one of the parties closes the evidence window, a hash of the messages and the timestamps of the generation of the evidence are signed by the server, optionally with sensitive records being hidden.

Figure 5:
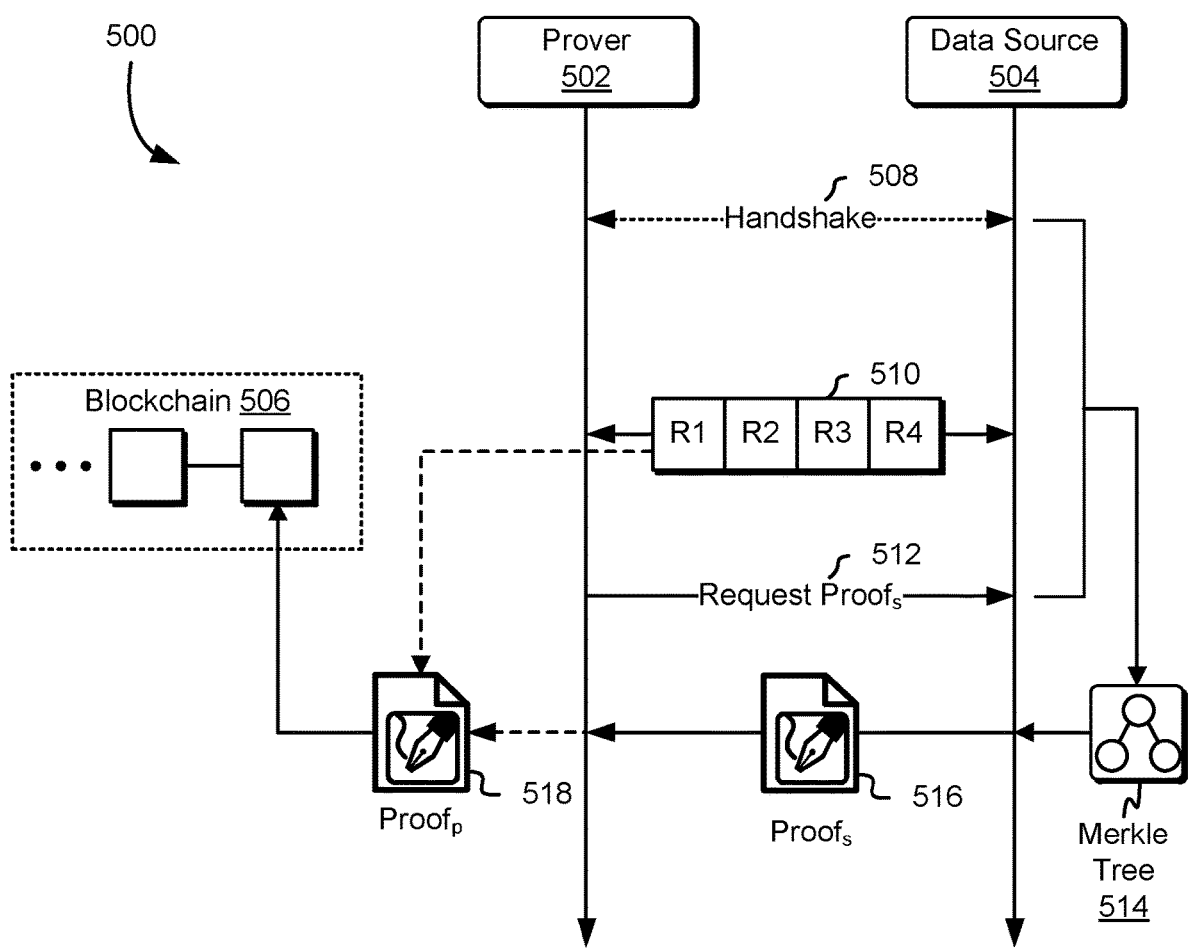
FIG. 5 illustrates a diagram that illustrates a protocol for obtaining data from a data source that is utilized in the execution of a program or script.

FIG. 5 is an illustrative diagram 500 of an embodiment in which a prover 502 obtains data from a data source 504. In an embodiment, a cryptographically protected communications session is established between the prover 502 and the data source 504. Examples of cryptographically protected communications sessions include Transport Layer Security (TLS) and Secure Sockets Layer (SSL) sessions. A cryptographically protected communications session may be utilized to provide a secure connection between parties. A secure connection, in this context, may refer to cryptographically verifiable assurances of authenticity, integrity, privacy, or any combination thereof. Authenticity may refer to assurances that a message was created by a party purporting to be the author of the message. Integrity may refer to assurances that a received message was not modified either intentionally (e.g., by a malicious party) or unintentionally (e.g., as a result of signal loss during transmission) from its original form when the message was transmitted. Confidentiality may refer to the encryption of some or all portions of messages prior to transmission. In an embodiment, a client (e.g., the prover 502) and server (e.g., the data source 504) exchange information during a first phase referred to as a handshake 508 wherein a hybrid of asymmetric and symmetric encryption issued in order to ensure security. The handshake illustrated in FIG. 5 may be a 4-way handshake in accordance with a TLS handshake protocol. In an embodiment, the client (e.g., the prover 502) transmits a ClientHello message that includes parameters such as a client version, session id, additional functionality through added extensions, or some combination thereof. In an embodiment, the handshake starts with a message the signals to the server (e.g., the data source 504) to start the recording of the proof for the conversation. As a result, the server (e.g., the data source 504) will enter an internal state associated with proof generation that will last until it receives a subsequent request to generate a proof of communications. While in this internal state, the data source 504 may record the contents (or portions thereof) of communications between the prover 502 and data source 504 exchanged over the cryptographically protected communications session.

After the handshake (e.g., during a record protocol), outgoing messages are divided into blocks 506, while incoming messages are reassembled. In an embodiment, a conversation between parties of a cryptographically protected communications session include a plurality of records $R_1 \ldots R_i$. These records may be utilized to generate a proof of communications, such as by generating a Merkle tree comprising a set of leaf nodes, the set of leaf nodes including the records $R_1 \ldots R_i$. The records illustrated and described in connection with FIG. 5 may be used to generate a Merkle tree, such as those described in connection with FIG. 6.

In an embodiment, records refer to requests and responses that form a conversation between the prover 502 and data source 504 as part of a cryptographically protected communications session. In some cases, the requests and response include more information than necessary (e.g., information that is irrelevant to determining input data that the prover 502 needs in connection with the execution of a smart contract). In an embodiment, the server (e.g., data source 504) fills in a template (e.g., in the form of a JSON node with specified fields). A template may be specified during the handshake. As an example, a template for obtaining weather data could have fields about location, date, and temperature. In an embodiment, a request for flight data can include the flight status, a flight identifier, and a date, such as in the following format: {"flightInfo":{"data":{"id":"BA886": [{"validDate":"2017-11-01T07:00:00+0000"},"status":"On time"}]}.

Once the handshake is completed, the parties (e.g., the prover 502 and data provider 504) may transmit records 510 between each other that include data. For example, the prover 502 may request data from the data provider 504 that can be used as an input to evaluate a circuit and generate an output as part of the execution of a smart contract. After the prover 502 receives sufficient data to evaluate the circuit, the prover may request a proof 512 of the session from the data provider 504. It should be noted that the data provider 504 may be a computer system that has a trust relationship with the client (e.g., clients described in connection with FIGS. 3 and 4) wherein the client trusts data that is generated and/or provided by the data provider—in this context, a client trusting data from another entity may refer to a client accepting the data obtained from the entity as being correct and/or that data published from a trusted source with a valid security certificate is true and accurate. In an embodiment, the server (e.g., the data source 504) generates a proof 518 of communications 516 that consists of a hash root 514 of all records exchanged between the parties during the record protocol from the completion of the handshake protocol until the request to generate the $\pi_{Communications}$ is received. In an embodiment, $W_{Time}$ is also hashed with the records, such as in the case where execution of the data is contingent upon an input being collected at a certain time (e.g., a smart contract for flight insurance protecting against the delay of a certain flight number on a particular day).

In an embodiment, the client (e.g., the prover 502) requests $\pi_{Communications}$ and the data provider returns the final value of a hash chain obtained from the commitments of all the records and $W_{Time}$ concatenated, hashed, and digitally signed with the data source's private key. Accordingly, data included in the records communicated between the parties can be utilized in the execution of a smart contract. This proof of communications $\pi_{Communications}$ can also be fed into the initial smart contract and verified through dedicated functions, thus eliminating the need for a semi-trusted prover. In an embodiment, the records are hashed together in a Merkle structure such as in the manner described in connection with FIG. 6.

It should be noted that while an embodiment in which the session client requests a proof from the session server is described in connection with FIG. 5, such need not be the case—the techniques described herein may be adapted so that a server of a TLS session requests a proof of communications from the client of the TLS session.

Figure 6:
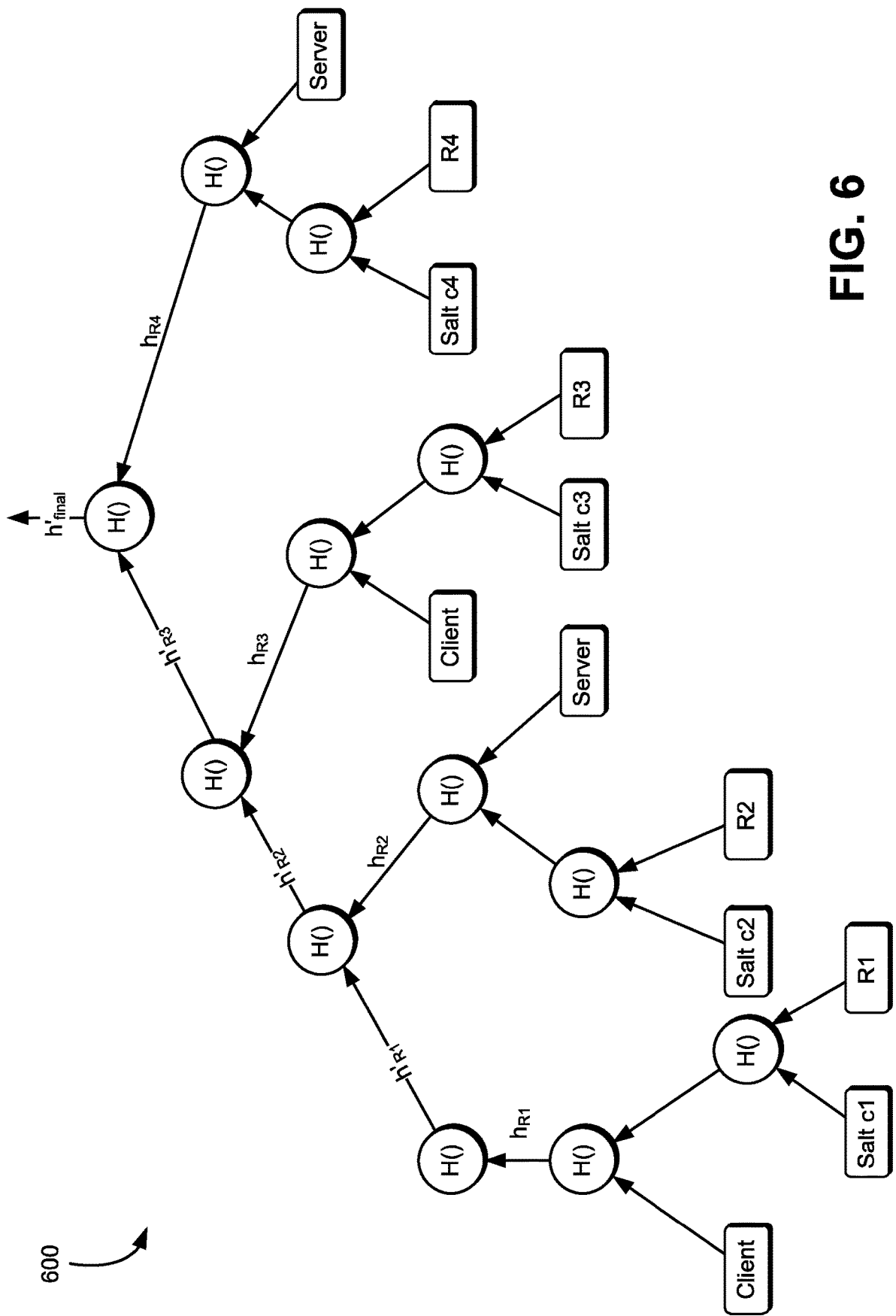
FIG. 6 illustrates a diagram of a Merkle tree in accordance with an embodiment.

FIG. 6 is an illustrative diagram 600 of a Merkle tree that may be constructed and/or utilized in accordance with various embodiments described in this disclosure. For example, such a Merkle tree may be constructed in the context of embodiments described in connection with FIGS. 2-5.

In an embodiment, a client computer system and a server computer system establish a cryptographically protected communications session such as a TLS session and exchange messages (e.g., records). One or more records $R_1 \ldots R_i$ communicated between the parties of the session may be recorded by the server for a specified duration—for example, from the completion of a handshake protocol until the server receives a request from the client to generate a proof of communications. In an embodiment, the server includes executable code that, if executed by one or more processors of the server, cause the server to: detect an indication to begin recording communications between the client and server; store records transmitted and received over a cryptographically protected communications; detect an indication to generate a proof of communications; and generate a Merkle tree based at least in part on the stored records. Various alternatives and extensions to the process described above are contemplated. A Merkle tree may refer to a data structure in which each leaf node of the Merkle tree is a hash of a data record and each non-leaf node is derived based at least in part from the non-leaf node's child nodes using at least a cryptographic hash function. However, it should be noted that techniques included herein may utilize structures similar to Merkle trees to verify that a particular piece of data is part of the Merkle tree—for example, in an embodiment, the techniques included herein are applied to a structure wherein the leaf nodes of a tree are data records and the non-leaf nodes are derived based at least in part from the non-leaf node's child nodes using at least a cryptographic hash function. In an embodiment, the tree data structures described herein are binary trees. It should be noted that while FIG. 6 illustrates an example of an unbalanced Merkle tree, in some embodiments, the leaf nodes of the Merkle tree are placed in such a manner as to balance or substantially balance the tree (e.g., a substantially balanced tree may have all leaf at a particular depth of the tree).

In an embodiment, the Merkle tree is generated from one or more records $R_1 \ldots R_i$ that are stored (e.g., cached by the server in short-term memory such as RAM) and, upon detecting an indication to generate a proof of communications, the records are chronologically selected as leaf nodes of a Merkle tree. Each record is cryptographically hashed with a random salt value, which may be derived from a handshake traffic secret, such as a TLS pre-master secret or master secret. The salts may be random numbers or pseudorandom number generated using any suitable stochastic process. The salts may be selected such that they are not re-used within the context of a particular Merkle tree, or selected in a manner such that the probability that any two salts are the same value is below a threshold probability.

A first salt and a first record may be inputs to a cryptographic hash function wherein the first salt and the first record are concatenated and hashed (e.g., using a SHA-256 cryptographic hash algorithm). Generally speaking, a pre-image resistant function such as a one-way function may be utilized where cryptographic hash functions are illustrated. While a salt is utilized in the illustrative example depicted in FIG. 6, the records may, generally speaking, be augmented with nonces, initialization vectors, and any other suitable cryptographic primitives. A first output is generated from performing a cryptographic hash algorithm using a first salt and a first record as inputs. The first output may be hashed with information that indicates whether the first record was transmitted by the client or service of the session. For example, FIG. 6 illustrates an embodiment in which information associated with the client is prepended to hash outputs wherein the client is the sender of the record and information associated with the service is appended to hash outputs wherein the service is the sender of the record. The prepended/appended information may be any suitable information—a fixed client value (e.g., zero) and a fixed server value (e.g., one) may be utilized:

$$h_{R_1} = H(0, H(\text{salt}_{C1}, R_1))$$

$$h_{R_2} = H(H(\text{salt}_{C2}, R_2), 1)$$

In an embodiment, the tree structure is fixed, and a value associated with the client or service (e.g., an IP address or MAC address associated with the sender) is prepended/appended to the Merkle tree. In one such example (not illustrated in FIG. 6):

$$h_{R_1} = H(\text{``client''}, H(\text{salt}_{C1}, R_1))$$

$$h_{R_2} = H(\text{``server''}, H(\text{salt}_{C2}, R_2))$$

Additional records transmitted over the cryptographically protected communications session can be created in the manner described above and sequentially hashed together to generate a root node value. In the example illustrated in FIG. 6, each node generates an intermediate node value:

$$h'_{R_1} = H(h_{R_1})$$

$$h'_{R_i} = H(h_{R_{i-1}}, h_{R_i}) \text{ for } i>1$$

In an embodiment (not illustrated in FIG. 6): $h'_{R_1} = h_{R_1}$.

In an embodiment, the final hash value is computed as $h'_{R_{last}} = H(h_{R_{last-1}}, h_{R_{last}})$ and is the root of the Merkle tree. In an embodiment, $h'_{R_{last}}$ is the proof of communications. In an embodiment, $h'_{R_{last}}$ is augmented with additional information such as a time interval (e.g., $W_{Time}$, timestamps for $R_1$ and $R_{last}$), which may be hashed together to form the proof of communications. The proof of communications may be digitally signed by a private key associated with the service of the cryptographically communications session wherein the service is an entity trusted by the smart contract client (e.g., as described in connection with FIGS. 3 and 4).

Figure 7:
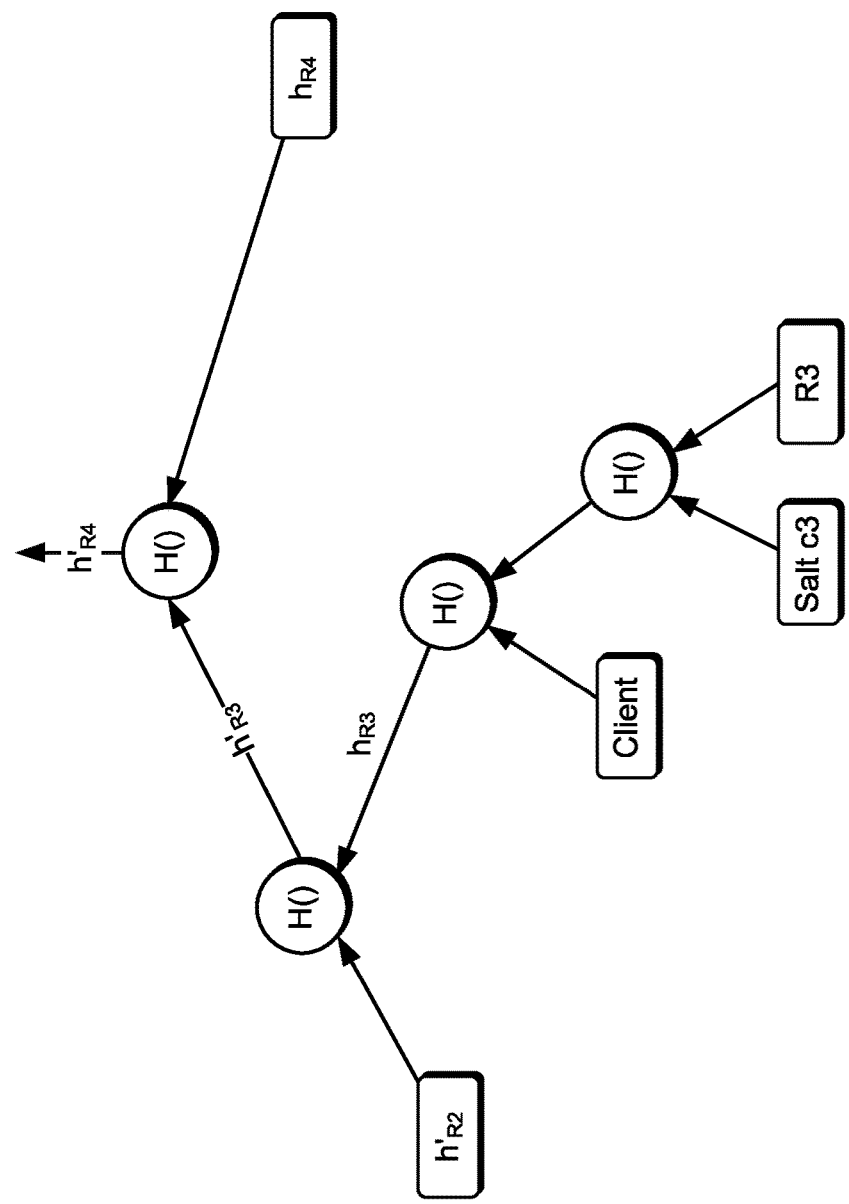
FIG. 7 illustrates a diagram of a Merkle path in accordance with an embodiment.
Figure 7:
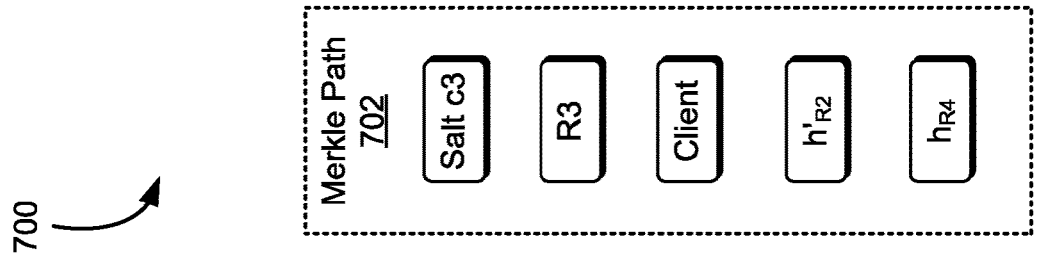

FIG. 7 is an illustrative diagram 700 of a Merkle path in accordance with various embodiments described in this disclosure. A Merkle path may be utilized to provide cryptographically verifiable assurances that a particular record (or, more generally, a particular piece of information or specific data) was communicated during a conversation between a client and service of a cryptographically protected communications session. The Merkle path may be constructed from a Merkle tree described in connection with FIG. 6 and may be utilized in the context of embodiments described in connection with FIGS. 2-5.

In an embodiment, a prover receives data from a data source and uses the data as an input to solve an arithmetic circuit and generate a proof of correct execution based at least in part on the output of the circuit. The prover may, additionally, generate an attestation that the data used in solving the arithmetic circuit was included in a set of communications between the prover and the data source. In an embodiment, the attestation is a Merkle path, wherein a Merkle path comprises a set of node values of a Merkle tree that are sufficient to calculate the root value of the Merkle tree. A Merkle path may include, some, all, or none of the leaf node values of the Merkle tree. The Merkle path may include information regarding the location of node values in the Merkle tree. It should be noted that the root node value may be the root node value of a subtree of a larger Merkle tree. The attestation maybe encoded in the proof of correctness $\pi_{Prover}$.

In an embodiment, a computing entity is able to verify that the contents of a particular communication were included in a set of communications between two other computing entities by: receiving, from a trusted entity, a root node value of a Merkle tree and a digital signature over the root node value generated using the trusted entity's private key; verifying authenticity of the digital signature using the trusted entity's public key; receiving a Merkle path comprising a set of node values, wherein a node of the set of nodes corresponds to a particular communication that is purported to have been communicated; computing a purported root value from the set of node values; and comparing the purported root value with the verified root node value.

Consider the Merkle path 702 illustrated in FIG. 7 which, in an embodiment, is derived based on a Merkle tree described in connection with FIG. 6. The Merkle path 702 illustrated in FIG. 7 can be utilized to verify that a particular record $R_3$ was included as part of a set of communications between a client and a server (e.g., over a TLS session). The set of values in the Merkle path 702 can be hashed together to generate a final hash value. In an embodiment, final hash value is generated based on additional information encoded in or in association with the Merkle path that indicates the order in which the values are hashed together. For example, the Merkle path 702 illustrated in FIG. 7 can be used to compute a final value $h_{R_4}=H(H(h'_{R_2}, H(0, H(salt_{C3}, R_3)))$, $h_{R_4})$ as illustrated in FIG. 7. If the final value matches the root value (e.g., $h'_{R_{last}}$ of FIG. 6) then a computing entity determines that the record $R_3$ was included as a communication in a set of communications between parties of a conversation.

Generally speaking, a Merkle path may refer to a set of nodes (or values of those nodes) of a Merkle tree that are sufficient to compute the value of a root node. The root node may be the root node of the Merkle tree illustrated in FIG. 7 or a subtree of such a tree. A Merkle path, such as the Merkle path illustrated in FIG. 7, may encode the values of two leaf nodes, and, at each depth of the Merkle tree between the leaf node to the root node, exactly one value corresponding to exactly one node of the Merkle tree. However, such need not be the case: another suitable Merkle path comprises the values of each leaf node of the Merkle tree—however, such a Merkle path may have greater storage requirements than other Merkle paths such as the one illustrated in FIG. 7.

FIG. 8 illustrates a diagram 800 of a computing environment which may be utilized to implement a protocol in accordance with various embodiments. The protocol may be implemented using blockchain technologies to store a proof-of-correctness generated based on data external to the blockchain. In an embodiment, the prover 802, data source 804, client 806, certificate authority 808 and blockchain 810 are in accordance with those described elsewhere in this disclosure—these components may be implemented as computing systems.

In an embodiment, a prover 802 is a computer system that includes executable code that, if executed by one or more processors of a computer system, causes the computer system to request data from a data source 804. The data source 804 may be any suitable computing entity that has a trust relationship with a client 806. The data may pertain to real-world events or, more generally, data that is not available on the blockchain. An example of data that may be requested is the status of an airline flight on a particular date (e.g., delayed, cancelled, arrived on time, and so on). The data source 804 may provide the requested data in response to the request, which may be provided in any suitable format, such as in the form of a datagram, webpage, JSON format, and more. In an embodiment, the prover receives the data and, in response to determining the data has been received, submits a second request to the data source 804 for a proof of communications. The data source 804 generates 812 a proof of communications that provides cryptographically verifiable assurances that the data was provided by the data source to the prover. The proof of communications may be digitally signed by a private key of the data source and authenticity of the digital signature may be verified using a public key associated with the data source. A digital certificate containing the public key may be issued by the certificate authority 808. The prover 802 and data source 804 may communicate via a cryptographically protected communications session 814 such as a TLS session that offers cryptographically verifiable assurances of authenticity, integrity, and confidentiality.

In an embodiment, the prover 802 receives an arithmetic circuit from the client 8 that encapsulates the terms of a smart contract. The prover 802 may execute the computation, wherein computation of the data is performed based at least in part on the data obtained from the data source 804. The prover 802 may obtain an output and generate 814 a proof-of-correct execution of the circuit that is broadcast to and recorded 816 on a blockchain network 810, thereby allowing nodes of the blockchain to validate the smart contract.

The execution of a smart contract that contains off-chain data (e.g., data about the real-world) relies on different levels of trust between parties. In order to gain trust, a prover may demonstrate to the client (or any other system that verifies whether the prover is honest) that a certain conversation took place between the prover and a data source that is trusted to produce the data. In an embodiment, the prover provides 818 the client a Merkle path (e.g., as described in connection with FIG. 7) comprising a record including the input data used to evaluate the arithmetic circuit and the proof of communications. The client receives the Merkle path and the proof of communications and verifies 820 that the particular record (or data of the record) was part of a communications with the trusted data source by obtaining a public key associated with the trusted data source (e.g., by requesting a digital certificate including the public key of the data source from a certificate authority 808), verifying authenticity of a digital signature generated over the proof of communications, generates a hash output from the Merkle path, and verifies that the generated hash output matches the received proof of communications. In this way, the client is able to determine that the input of the smart contract was provided by a trusted source.

In an embodiment, the client verifies 822 the proof of correctness, such as in the manner described elsewhere in this disclosure and/or using techniques described in U.K. Patent Application No. 1719998.5. The client may also generate 824 a reputation transaction that is recorded 826 to the blockchain and broadcasts to the blockchain network a review of the client indicating whether the prover acted honestly in the fulfilment of the execution of the particular smart contract described above. In this context, honestly may refer to the prover using the same data provided by the data source to execute the smart contract, as opposed to a dishonest entity which uses a different input to execute the smart contract, thereby, in some embodiments, altering the outcome of the execution of the smart contract.

Figure 9:
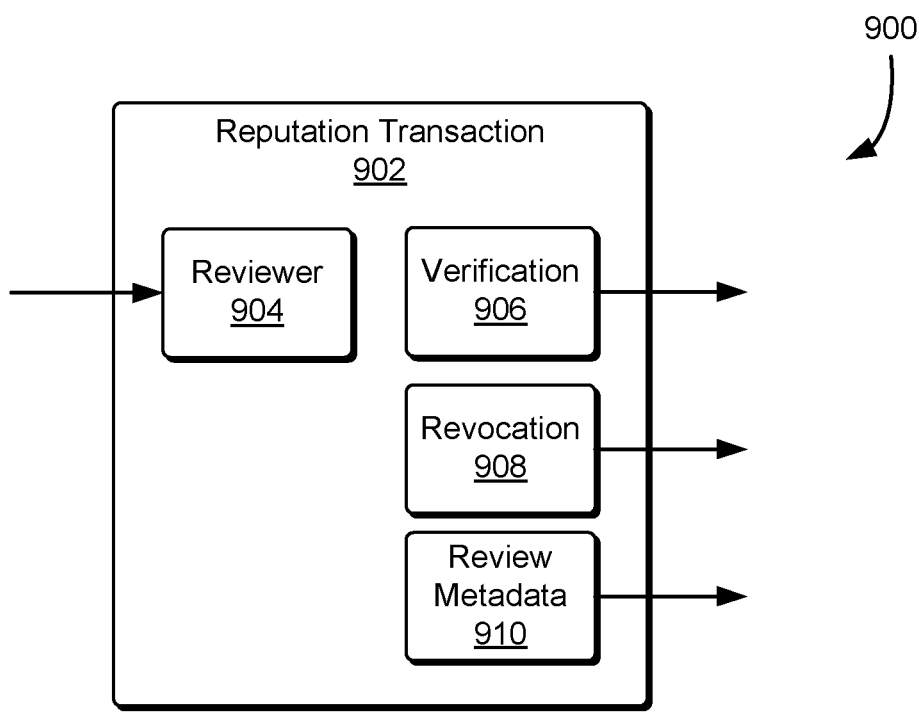
FIG. 9 illustrates a diagram of a reputation transaction in accordance with an embodiment.

FIG. 9 is an illustrative diagram 900 of a reputation transaction 902 that may be utilized in various contexts, such as embodiments described in connection with FIGS. 4 and 8. In an embodiment, a reputation transaction is a type of post-contract execution verification with the assumption that a prover is honest. This type of verification, in an embodiment, does not influence the execution of the contract, but rather, is utilized as a metric that contributes to the reputation of provers. Once a smart contract has been executed, the client has the opportunity to review the services of the prover with the incentive of increasing the performance of the smart contract market by promoting well-behaving provers. Conversely, provers are incentivized to behave correctly since whether they do so has a direct impact on their reputation and on their potential future clients—clients may select provers based on their reputation (or lack thereof).

In an embodiment, a client (e.g., as described in connection with FIG. 4) creates a transaction with a reviewer 904 input. The reviewer input may be a transaction input that is signed using the client's private key. Generally speaking, the reviewer input may be any information that provides a publicly verifiable attestation that the client is the reviewer of the reputation transaction. The reputation transaction comprises three outputs. A verification 906 output may have an associated unlocking script that takes as input a public key, a signature, and a Merkle path. At verification time, the Merkle path may be used to prove that a record belongs to the conversation proof signed and sent by a trusted entity (e.g., a data provider as described in connection with FIG. 4). Generally speaking, the verification 906 output is a transaction output that includes an expected value and authentication information usable to generate the expected value—the expected value may be digitally signed, authenticity of the digital signature verifiable using a public key as described above. The authentication information, in an embodiment, is a Merkle path usable to generate a root hash value. The second output may be a revocation 908 output that includes an address belonging to the client. In an embodiment, unlocking the revocation output is symbolic of the review being cancelled or revoked. The reputation transaction may also encode review metadata 910 as a third transaction output that includes information about the prover's identity (e.g., prover's address), the smart contract the prover executed, and an indication of a positive review). In a Bitcoin-based embodiment, the reputation metadata 910 is implemented as an OP_RETURN output. In an embodiment, the outputs may have a nominal amount of digital assets (e.g., dust values) or no value at all (in the case of an OP_RETURN output that cannot be spent). A Bitcoin-based system, in an embodiment, may have a reputation transaction implemented in accordance with the following:

| Input Addresses | Amount Input | Unlocking Script | Amount Output |
|---|---|---|---|
| Client | 2d + miner fee (ClientSig) | Verification Unlocking Script: OP_8 OP_ROLL (OP_CAT OP_SHA256 OP_SWAP OP_IF OP_SWAP OP_ENDIF) * 4 <h'final> OP_EQUAL ProverPubKey OP_CHECKSIG | d |
| | | Revocation Unlocking Script: ClientPubKey OP_CHECKSIG | d |
| | | Review Metadata Unlocking Script: OP_RETURN SCMReview 1 proverID contractID | 0 |

It should be further noted that OP_CAT may refer to any opcode, routine, command, or function that is suitable for concatenating two strings.

Figure 10:
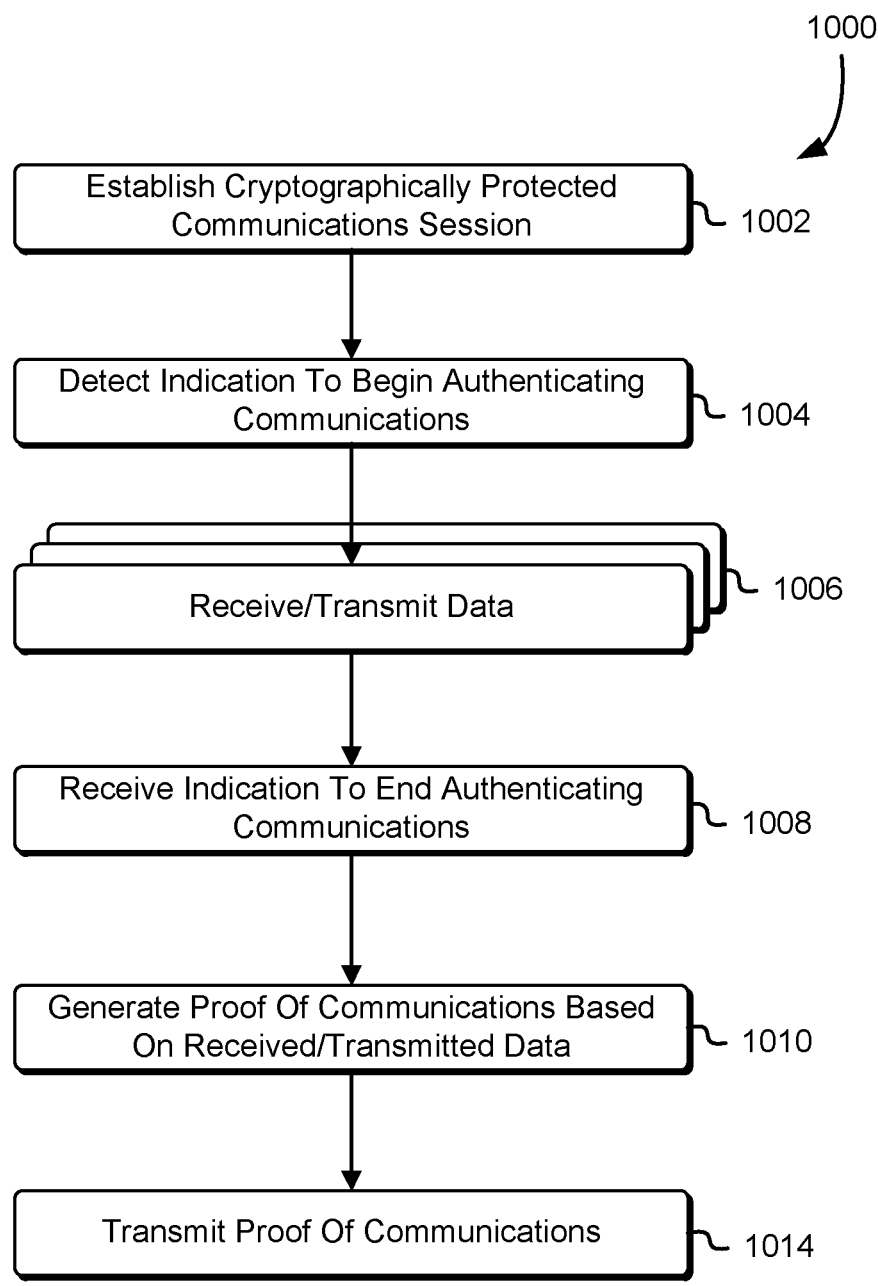
FIG. 10 is an illustrative diagram of a process for generating a proof of communications.

FIG. 10 is an illustrative diagram of a process 1000 for generating a proof of communications. In an embodiment, the process 1000 is implemented using hardware, software, or a combination thereof. A suitable system for performing the process includes a data provider, such as those described in connection with FIG. 4. Generally speaking, the system performing the process 1000 may be any suitable system which is trusted by a computing entity that delegates the execution of a smart contract or other computational task to another computing entity. Trust, in this context, may refer to one computing entity accepting the data originating from and/or broadcasted by the trusted entity as being correct and/or that data published from a trusted source with a valid security certificate is true and accurate.

In an embodiment, the system performing the process 1000 includes executable code that, if executed by one or more processors of the system, causes the system to establish 1002 a cryptographically protected communications sessions with a computing entity such as a prover. A client may have a list of trusted sources for data that is utilized in the execution of a smart contract—the list may be published (e.g., as part of or in association with the smart contract or elsewhere on the blockchain). An example of a cryptographically protected communications session is a TLS session.

The system may detect 1004 an indication to begin authenticating communications between the system and the counterparty. The indication may be implicitly defined as part of a protocol—for example, the system may begin authenticating communications upon completion of a 4-way handshake protocol. In an embodiment, the indication is received by the system as a message in accordance with a record protocol, the message indicating to begin authenticating communications. It should be noted that authenticating communications may also be referred to as notarizing communications and/or conversations between two or more computing entities. As part of an indication to begin authenticating communications, the system may record a timestamp of when the system began authenticating the communications.

Subsequent to the indication to begin authenticating communications, the system may receive and/or transmit 1006 data as part of a record protocol, and the communications (or data contained therein) may be recorded in any suitable format, such as in short-term memory as a data structure. It should be noted that the stacked boxes illustrated in connection with the receiving and transmitting of data indicates that multiple records may be received and transmitted, although such need not be the case—in an embodiment, a single record is received and/or transmitted.

In an embodiment, the system, subsequent to receiving the indication to begin authenticating communications, may receive 1008 an indication to end authenticating communications with the counterparty. In an embodiment, the system records a timestamp of when the request to end authenticating communications was detected. In some cases, the ending is detected implicitly, such as by the termination of the cryptographically protected communications session.

In an embodiment, the system generates 1010 a proof of communications based on the records (or portions thereof) transmitted and/or received during the authentication period (i.e., the time between when the system detected to begin authenticating and end authenticating communications). The system may generate the proof of communications by generating a Merkle tree in the manner described in connection with FIG. 7. The root of the Merkle tree may be the proof of communications. In an embodiment, proof of communications is determined based on the root of the Merkle tree and W_time that encodes the time interval over which the authenticated communications occurred. The proof of communications may be digitally signed by the system using a private key wherein the corresponding public key is accessible via a certificate authority that issues digital certificates. In an embodiment, the system is the data provider described in connection with FIGS. 3-5 and 8. Upon generating the proof of communications, the system may transmit 1014 the proof of communications to the counterparty of the session (e.g., a prover) and/or another entity (e.g., the client, as specified by the prover during the session).

Figure 11:
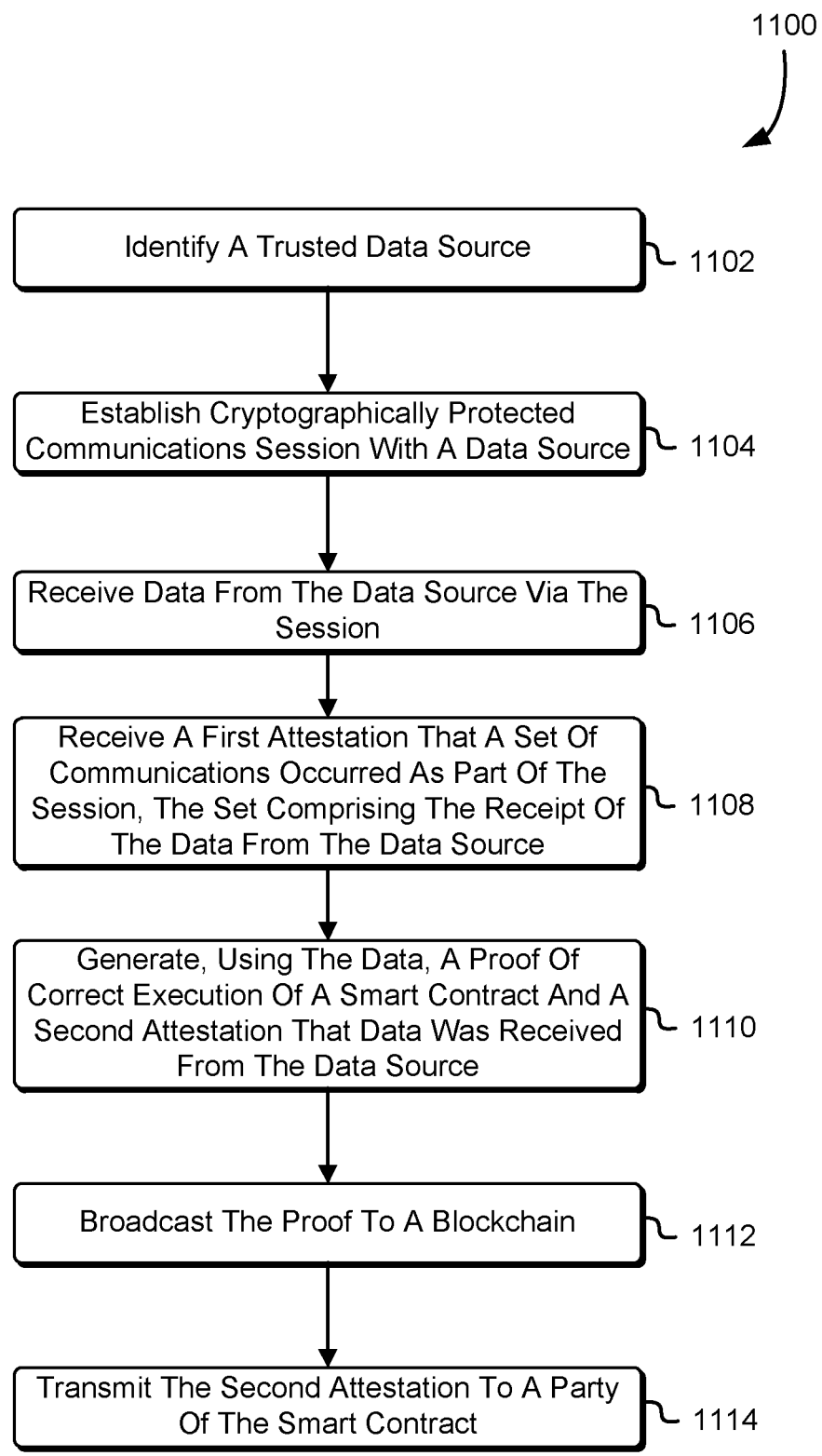
FIG. 11 is an illustrative diagram of a process for execution of a program or script using authenticated data.

FIG. 11 is an illustrative diagram of a process 1100 for execution of a program or script using authenticated data, such as a smart contract published to a blockchain network. In an embodiment, external data (e.g., data about real-world events) is authenticated whereas data that is obtainable from the blockchain is not authenticated. The data referred to in this context may refer to input data that is used as part of the evaluation an arithmetic circuit to generate an output that is used in a smart contract. In an embodiment, the process 1100 is implemented using hardware, software, or a combination thereof. A suitable system for performing the process includes a prover, such as those described in connection with FIGS. 2-4 and 8.

In an embodiment, the system determines that external data should be obtained for execution of a smart contract on behalf of a client. The system may identify 1102 a computing entity that the data may be obtained from, the computing entity being an entity that is trusted by the client. The client may publish a list of trusted entities, such as in or in association with the smart contract, or elsewhere on the blockchain and the system selects any suitable trusted entity to obtain external data from. In an embodiment, the system establishes 1104 a cryptographically protected communications session with the data source. An example of a cryptographically protected communications session is a TLS or SSL session.

In an embodiment, the system requests the external data from the source and receives 1106 the data from the data source via the cryptographically protected communications session. External data may be used in a variety of contexts surrounding smart contracts, including, but not limited, to smart contracts for use in securities (e.g., interest rate, derivatives, bonds) that require access to market price feeds for assets and financial applications (e.g., interest rates); peer-to-peer insurance smart contracts that require access to external data (e.g., flight information for which a party is insured against delays; weather data for financial derivatives contracts using a data feed of the weather instead of the price index for crop insurance); trade smart contracts that need GPS data about shipments; gambling contracts that require access to random number generators; and more.

After the system receives the external data, the system may provide an indication to the data source to provide a first attestation that a set of communications occurred as part of the cryptographically protected communications session wherein the set of communications comprises the system receiving the external data from the trusted data source. The system may receive 1108 the first attestation. The first attestation may be a proof of communications that is the hash root of a Merkle tree. The first attestation may be digitally signed, authenticity of the digital signature being verifiable by a public key associated with the trusted data source.

In an embodiment, the system generates 1110, uses the data as an input x to an arithmetic circuit C, wherein the circuit is used to generate a quadratic program to generate one or more outputs y. In an embodiment, the system (e.g., the prover) obtains, as the output, a valid transcript for $\{C, x, y\}$ that is an assignment of values to the circuit wires such that the values assigned to the input wires are those of x. The system may also generate an attestation that the data used as an input to the arithmetic circuit was the data obtained from the trusted source. The attestation may be a Merkle path as described elsewhere in this disclosure, such as in connection with FIGS. 6 and 7. The system may broadcast 1112 the proof of correct execution of the smart contract to the blockchain. The system may transmit 1114 the second attestation (e.g., the Merkle path), the first attestation (i.e., the attestation received from the data source, such as a proof of communications), a public key associated with the trusted entity, or some combination thereof.

It should be noted that in the context of this disclosure, pre-image resistant functions include one-way functions, which refer to functions that may not be computationally difficult to compute for a current value, but may not be computationally trivial to determine a previous value from the current value. In some cases, a one-way membership function is not mathematically proven/provable as one-way, but nevertheless has computational complexity properties that render the function pre-image resistant. one-way functions—also referred to as "effectively one-way functions"—include, but are not limited to: cryptographic hash functions such as message authentication codes (e.g., hash based message authentication code (HMAC)), key derivation functions such as PBKDF2 and bcrypt (e.g., with the password being based at least in part on the plaintext and the cryptographic key) and other secure randomization functions which may, but do not necessarily, have a domain (set of possible inputs) that is larger than their range (possible outputs). Other suitable functions for various embodiments include, but are not limited to: functions that accept at least a plaintext and cryptographic key as inputs and that have a property of pre-image resistance such that the probability of randomly generating an input is below a specified threshold, second pre-image resistance (given an input x1, the probability of randomly generating different input x2 such that $f(x1)=f(x2)$ is below a specified threshold) and/or collision resistance (e.g., the probability of two different inputs resulting in the same output is less than a specified threshold).

Figure 12:
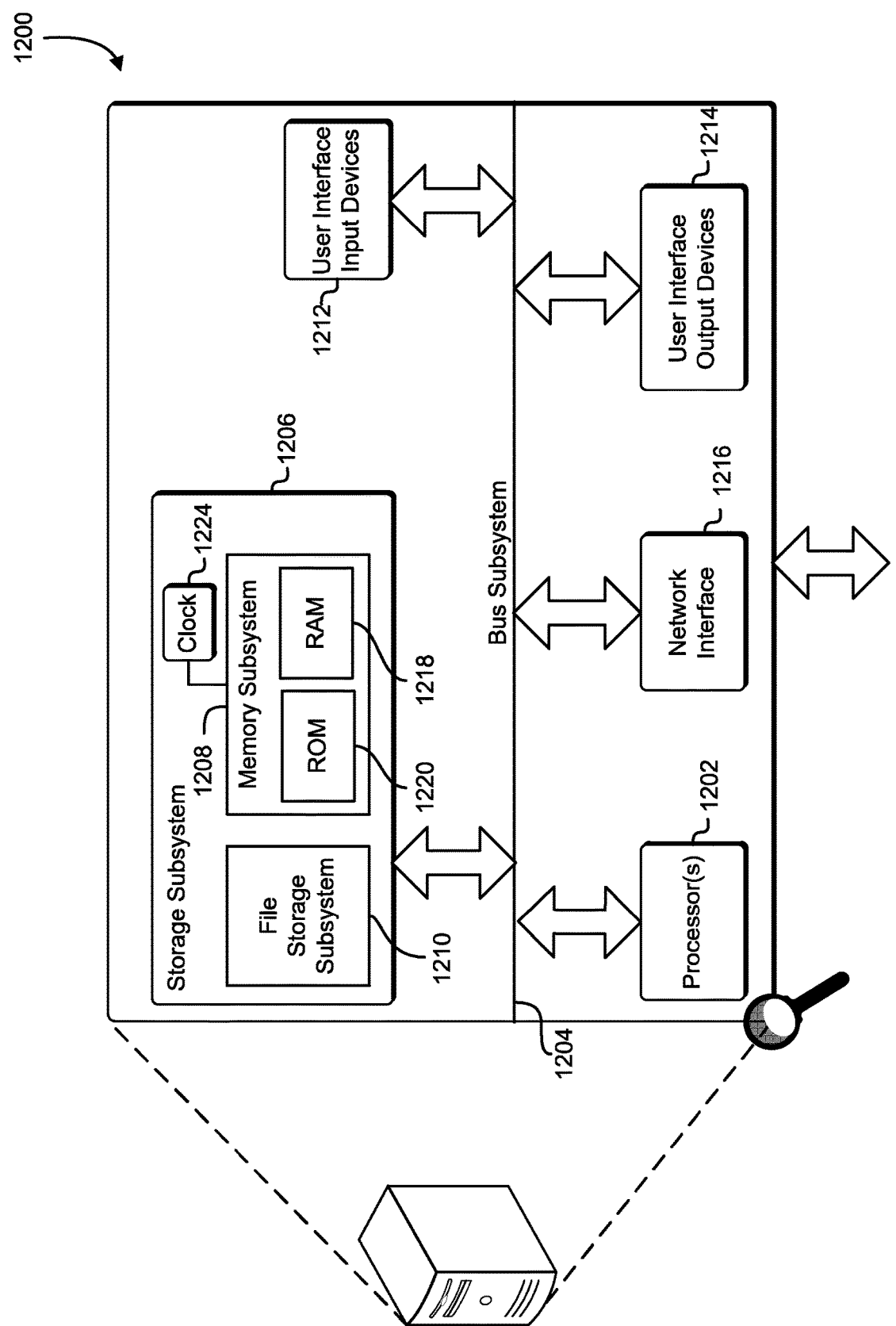
FIG. 12 illustrates a computing device that can be used to practice at least one embodiment of the present disclosure.

FIG. 12 is an illustrative, simplified block diagram of a computing device 1200 that can be used to practice at least one embodiment of the present disclosure. In various embodiments, the computing device 1200 can be used to implement any of the systems illustrated and described above. For example, the computing device 1200 can be configured for use as a data server, a web server, a portable computing device, a personal computer, or any electronic computing device. As shown in FIG. 12, the computing device 1200 could include one or more processors 1202 that, in embodiments, communicate with and are operatively coupled to a number of peripheral subsystems via a bus subsystem 1204. In some embodiments, these peripheral subsystems include a storage subsystem 1206 comprising a memory subsystem 1208 and a file/disk storage subsystem 1210, one or more user interface input devices 1212, one or more user interface output devices 1214, and a network interface subsystem 1216. Such storage subsystem 1206 could be used for temporary or long-term storage of information.

In some embodiments, the bus subsystem 1204 provides a mechanism for enabling the various components and subsystems of computing device 1200 to communicate with each other as intended. Although the bus subsystem 1204 is shown schematically as a single bus, alternative embodiments of the bus subsystem utilize multiple busses. In some embodiments, the network interface subsystem 1216 provides an interface to other computing devices and networks. The network interface subsystem 1216, in some embodiments, serves as an interface for receiving data from and transmitting data to other systems from the computing device 1200. In some embodiments, the bus subsystem 1204 is utilised for communicating data such as details, search terms, and so on.

In some embodiments, the user interface input devices 1212 includes one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 1200. In some embodiments, the one or more user interface output devices 1214 include a display subsystem, a printer, or non-visual displays such as audio output devices, etc. In some embodiments, the display subsystem includes a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 1200. The one or more user interface output devices 1214 can be used, for example, to present user interfaces to facilitate user interaction with applications performing processes described and variations therein, when such interaction may be appropriate.

In some embodiments, the storage subsystem 1206 provides a computer-readable storage medium for storing the basic programming and data constructs that provide the functionality of at least one embodiment of the present disclosure. The applications (programs, code modules, instructions), when executed by one or more processors in some embodiments, provide the functionality of one or more embodiments of the present disclosure and, in embodiments, are stored in the storage subsystem 1206. These application modules or instructions can be executed by the one or more processors 1202. In various embodiments, the storage subsystem 1206 additionally provides a repository for storing data used in accordance with the present disclosure. In some embodiments, the storage subsystem 1206 comprises a memory subsystem 1208 and a file/disk storage subsystem 1210.

In embodiments, the memory subsystem 1208 includes a number of memories, such as a main random access memory (RAM) 1218 for storage of instructions and data during program execution and/or a read only memory (ROM) 1220, in which fixed instructions can be stored. In some embodiments, the file/disk storage subsystem 1210 provides a non-transitory persistent (non-volatile) storage for program and data files and can include a hard disk drive, a floppy disk drive along with associated removable media, a Compact Disk Read Only Memory (CD-ROM) drive, an optical drive, removable media cartridges, or other like storage media.

In some embodiments, the computing device 1200 includes at least one local clock 1224. The local clock 1224, in some embodiments, is a counter that represents the number of ticks that have transpired from a particular starting date and, in some embodiments, is located integrally within the computing device 1200. In various embodiments, the local clock 1224 is used to synchronize data transfers in the processors for the computing device 1200 and the subsystems included therein at specific clock pulses and can be used to coordinate synchronous operations between the computing device 1200 and other systems in a data centre. In another embodiment, the local clock is a programmable interval timer.

The computing device 1200 could be of any of a variety of types, including a portable computer device, tablet computer, a workstation, or any other device described below. Additionally, the computing device 1200 can include another device that, in some embodiments, can be connected to the computing device 1200 through one or more ports (e.g., USB, a headphone jack, Lightning connector, etc.). In embodiments, such a device includes a port that accepts a fibre-optic connector. Accordingly, in some embodiments, this device is that converts optical signals to electrical signals that are transmitted through the port connecting the device to the computing device 1200 for processing. Due to the ever-changing nature of computers and networks, the description of the computing device 1200 depicted in FIG. 12 is intended only as a specific example for purposes of illustrating the preferred embodiment of the device. Many other configurations having more or fewer components than the system depicted in FIG. 12 are possible.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method comprising:
   at a prover computer system:
   establishing a cryptographically protected communications session with a computing entity;
   receiving, via the cryptographically protected communications session, a first communication comprising input data that controls execution of a program published to a blockchain network;
   receiving a first attestation that a set of communications occurred via the cryptographically protected communications session, the set of communications including the first communication;

executing the program using the input data, wherein execution of the program results in generation of a proof of correct execution of the program;

generating, based at least in part on the received input data, a second attestation that the input data was contained in the first communication;

providing the proof of correct execution of the program to another computer system to be mined onto the blockchain network; and providing the first attestation and second attestation to a client computer system; and at the client computer system:

using the first attestation and second attestation to verify that the input data used to generate the proof of correct execution was received from the computing entity; and generating a reputation transaction to be mined onto the blockchain network, wherein the reputation transaction is a record that the prover computer system used the input data received from the computing entity to execute the program.

2. The computer-implemented method according to claim 1, wherein each communication of the set of communications has a corresponding intermediate node determined based on whether said communication was received or transmitted.

3. The computer-implemented method according to claim 1, wherein the program comprises a set of rules agreed upon by two or more parties and the method further comprising selecting the computing entity from one or more computing entities trusted by at least one of the two or more parties.

4. The computer-implemented method according to claim 1, further comprising:

detecting a blockchain transaction comprising:

a first transaction output comprising a first locking script, wherein a first digital asset associated with the first transaction output is unlockable by an unlocking script that encodes:

a public key associated with the computing entity;

a digital signature encoding an expected value, authenticity of the digital signature cryptographically verifiable using the public key; and authentication information usable to generate the expected value; and a second transaction output encoding an indication the proof of correct execution is valid; and unlocking the first digital asset by providing at least the public key, the digital signature, and the authentication information.

5. The computer-implemented method according to claim 4, the blockchain transaction further comprising:

a transaction input digitally signed using a private key associated with the other computer system;

a third transaction output comprising a second unlocking script, wherein a second digital asset associated with the third transaction output is unlockable using the private key; and the second transaction output further encodes an identifier associated with the other computer system.

6. The computer-implemented method according to claim 4, wherein the authentication information comprises a Merkle path of a Merkle tree and the expected value is based at least in part on a root node of the Merkle tree.

7. The computer-implemented method according to claim 1, wherein the input data comprises binary data indicating whether an event occurred.

8. The computer-implemented method according to claim 1, wherein the input data is data that comprises information that is not verifiable based on other data on a blockchain of the blockchain network.

9. The computer-implemented method according to claim 1, wherein the first attestation is a digital signature, authenticity of the digital signature verifiable using a cryptographic public key associated with the computing entity.

10. A system, comprising:

a processor; and memory including executable instructions that, as a result of being executed by the processor, cause the system to perform the computer-implemented method according to claim 1.

11. A non-transitory computer-readable storage medium having stored thereon executable instructions that, as a result of being executed by a processor of a computer system, cause the computer system to at least perform the computer-implemented method according to claim 1.

12. A system, comprising:

a processor; and memory including executable instructions that, as a result of being executed by the processor, cause the system to perform the computer-implemented method according to claim 2.

13. A non-transitory computer-readable storage medium having stored thereon executable instructions that, as a result of being executed by a processor of a computer system, cause the computer system to at least perform the computer-implemented method according to claim 2.

14. A system, comprising:

a processor; and memory including executable instructions that, as a result of being executed by the processor, causes the system to perform the computer-implemented method according to claim 9.

15. A non-transitory computer-readable storage medium having stored thereon executable instructions that, as a result of being executed by a processor of a computer system, cause the computer system to at least perform the computer-implemented method according to claim 9.

* * * * *